US011370931B2

(12) United States Patent
Sato et al.

(10) Patent No.: US 11,370,931 B2
(45) Date of Patent: *Jun. 28, 2022

(54) PHOTOCURABLE INK COMPOSITION AND IMAGE FORMING METHOD

(71) Applicant: FUJIFILM CORPORATION, Tokyo (JP)

(72) Inventors: Noriaki Sato, Kanagawa (JP); Ichiro Koyama, Kanagawa (JP); Shota Suzuki, Kanagawa (JP); Yasuhiro Sawamura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 16/662,000

(22) Filed: Oct. 23, 2019

(65) Prior Publication Data
US 2020/0056061 A1 Feb. 20, 2020

Related U.S. Application Data

(63) Continuation of application No. PCT/JP2018/016376, filed on Apr. 20, 2018.

(30) Foreign Application Priority Data

Apr. 26, 2017 (JP) ................ JP2017-087555

(51) Int. Cl.
*C09D 11/38* (2014.01)
*B41J 2/44* (2006.01)
*C08K 5/00* (2006.01)
*C08K 5/07* (2006.01)
*C08L 33/14* (2006.01)
*C08L 33/26* (2006.01)

(52) U.S. Cl.
CPC ............ *C09D 11/38* (2013.01); *B41J 2/44* (2013.01); *C08K 5/005* (2013.01); *C08K 5/07* (2013.01); *C08L 33/14* (2013.01); *C08L 33/26* (2013.01)

(58) Field of Classification Search
CPC ..... C09D 11/38; C09D 11/322; C09D 11/107; C09D 11/101; C08L 33/26; C08L 33/14; C08K 5/07; C08K 5/005; B41B 5/00; B41J 2/44; B41J 2/01
See application file for complete search history.

(56) References Cited

U.S. PATENT DOCUMENTS

| 3,844,916 | A | 10/1974 | Gaske | |
| 9,441,127 | B2* | 9/2016 | Suzuki | C09D 139/06 |
| 10,711,145 | B2* | 7/2020 | Sato | C09D 11/102 |
| 10,808,134 | B2* | 10/2020 | Sato | C09D 11/101 |
| 10,870,769 | B2* | 12/2020 | Koyama | C09D 11/102 |
| 2009/0197056 | A1 | 8/2009 | Yokoi et al. | |
| 2010/0021698 | A1 | 1/2010 | Chretien et al. | |
| 2011/0241264 | A1 | 10/2011 | Yokoi | |
| 2014/0191213 | A1* | 7/2014 | Sawada | G02B 1/04 257/40 |
| 2016/0090494 | A1 | 3/2016 | Suzuki | |
| 2018/0162979 | A1* | 6/2018 | Sato | B41J 11/002 |
| 2019/0375953 | A1 | 12/2019 | Sato et al. | |
| 2019/0382603 | A1 | 12/2019 | Sato et al. | |

FOREIGN PATENT DOCUMENTS

| CN | 101623965 A | 1/2010 | |
| CN | 102206443 A | 10/2011 | |
| CN | 110366585 A | 10/2019 | |
| CN | 110392718 A | 10/2019 | |
| DE | 2346424 A1 | 4/1974 | |
| EP | 0309401 A1 * | 3/1989 | ........... C07D 401/14 |
| EP | 2484730 A1 | 8/2012 | |
| EP | 3000854 A1 | 3/2016 | |
| JP | 2006-241191 A | 9/2006 | |
| JP | 2006-241193 A | 9/2006 | |
| JP | 2009-209352 A | 9/2009 | |
| JP | 2011-162716 A | 8/2011 | |
| JP | 2011-225848 A | 11/2011 | |

(Continued)

OTHER PUBLICATIONS

Extended European Search Report dated Mar. 25, 2020, issued in corresponding EP Patent Application No. 18792146.5.
International Search Report issued in International Application No. PCT/JP2018/016376 dated Jul. 24, 2018.
Written Opinion of the ISA issued in International Application No. PCT/JP2018/016376 dated Jul. 24, 2018.
Written Opinion of the IPEA issued in International Application No. PCT/JP2018/016376 dated May 14, 2019.
International Preliminary Report on Patentability issued in International Application No. PCT/JP2018/016376 dated Aug. 20, 2019.
English language translation of the following: Office action dated Dec. 1, 2020 from the JPO in a Japanese patent application No. 2019-514473 corresponding to the instant patent application.

(Continued)

*Primary Examiner* — Sanza L. McClendon
(74) *Attorney, Agent, or Firm* — Solaris Intellectual Property Group, PLLC

(57) ABSTRACT

Provided are a photocurable ink composition including a resin which contains an amino group having one or more hydrogen atoms on a carbon atom at an α-position and having an amine value of 3.5 mmol/g to 12 mmol/g, and a radically polymerizable monomer, in which the radically polymerizable monomer contains at least one of a monofunctional radically polymerizable monomer or a bifunctional radically polymerizable monomer, a total content of the monofunctional radically polymerizable monomer and the bifunctional radically polymerizable monomer is 50% by mass or greater with respect to a total mass of the photocurable ink composition, and a content of a radically polymerizable monomer containing an acid group in the radically polymerizable monomers is 1.5 mmol or less per 100 g of the photocurable ink composition; and an image forming method performed by using the photocurable ink composition.

13 Claims, No Drawings

(56) References Cited

FOREIGN PATENT DOCUMENTS

| | | | | |
|---|---|---|---|---|
| JP | 2013-53173 A | 3/2013 | | |
| WO | 2017/033984 A1 | 3/2017 | | |
| WO | WO-2017033984 A1 * | 3/2017 | ........... | C09D 11/107 |
| WO | 2018155174 A1 | 8/2018 | | |
| WO | 2018179947 A1 | 10/2018 | | |

OTHER PUBLICATIONS

English language translation of the following: Office action dated Aug. 4, 2021 from the SIPO in a Chinese patent application No. 201880027435.1 corresponding to the instant patent application. This office action translation is submitted now in order to supplement the understanding of the cited references which are being disclosed in the instant Information Disclosure Statement.

* cited by examiner

PHOTOCURABLE INK COMPOSITION AND IMAGE FORMING METHOD

CROSS-REFERENCE TO RELATED APPLICATIONS

This application is a Continuation of International Application No. PCT/JP2018/016376 filed on Apr. 20, 2018, which claims priority to Japanese Patent Application No. 2017-087555 filed on Apr. 26, 2017. The entire contents of these applications are incorporated herein by reference.

BACKGROUND OF THE INVENTION

1. Field of the Invention

The present disclosure relates to a photocurable ink composition and an image forming method.

2. Description of the Related Art

As an image recording method of forming an image on a recorded medium such as paper or plastic based on an image data signal, an electrophotographic method, a sublimation-type thermal transfer method, a fusion-type thermal transfer method, a screen printing method, or an ink jet method is exemplified.

Further, as photocurable compositions of the related art, those described in JP2011-225848A and JP2009-209352A have been known.

In a case of the ink jet method, since a printing device is inexpensive and an image is formed directly on a recorded medium by jetting an ink composition only to an image area to be required without using a plate during printing, the ink composition can be efficiently used, and thus the running cost is low particularly in a case of small lot production. Further, the ink jet method is an excellent image recording method with little noise and thus has been attracting attention in recent years.

For example, an active-radiation curable ink composition including (A) polymer which includes two or more acidic groups or two or more basic groups; (B) polymerizable monomer which includes a substituent capable of forming a counter salt for the acidic groups or the basic groups included in the polymer (A); (C) photopolymerization initiator; and (D) polymerizable monomer which has a structure different from that of the polymerizable monomer (B) has been known (for example, see JP2011-225848A) as an ink composition which is excellent in jetting stability even in a case of being stored for a long period of time and has high sensitivity and in which an image obtained by curing the composition has excellent flexibility, excellent adhesiveness to a recording medium, and high surface hardness.

Further, JP2009-209352A discloses an ink composition (a) which contains a polymer containing a partial structure selected from the group consisting of a fluorine-substituted hydrocarbon group, a siloxane skeleton, and a long chain alkyl group, a radically polymerizable group, and a tertiary amine structure.

SUMMARY OF THE INVENTION

According to an embodiment of the present invention, an object for solving the above-described problem is to provide a photocurable ink composition from which a cured film with excellent solvent resistance and glossiness can be obtained.

Further, according to another embodiment of the present invention, an object for solving the above-described problem is to provide an image forming method performed by using the photocurable ink composition.

Means for solving the above-described problem includes the following aspects.

<1> A photocurable ink composition comprising: a resin which contains an amino group having one or more hydrogen atoms on a carbon atom at an α-position and having an amine value of 3.5 mmol/g to 12 mmol/g; and a radically polymerizable monomer, in which the radically polymerizable monomer contains at least one of a monofunctional radically polymerizable monomer or a bifunctional radically polymerizable monomer, a total content of the monofunctional radically polymerizable monomer and the bifunctional radically polymerizable monomer is 50% by mass or greater with respect to a total mass of the photocurable ink composition, and a content of a radically polymerizable monomer containing an acid group in the radically polymerizable monomers is 1.5 mmol or less per 100 g of the photocurable ink composition.

<2> The photocurable ink composition according to <1>, in which the amine value of the resin is 4 mmol/g or greater.

<3> The photocurable ink composition according to <1> or <2>, in which the amine value of the resin is 8 mmol/g or greater.

<4> The photocurable ink composition according to any one of <1> to <3>, in which the resin has a constitutional unit represented by at least one of Formula (1) or Formula (2).

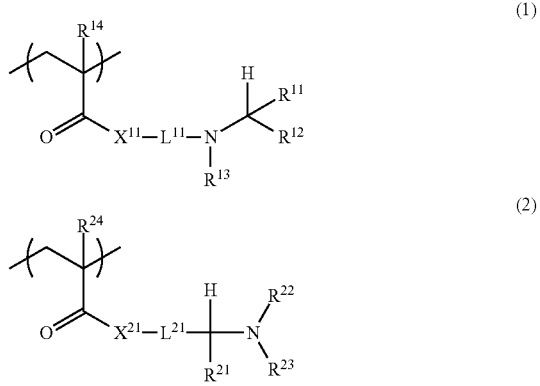

In Formula (1), $X^{11}$ represents O or $NR^{15}$, $R^{11}$ to $R^{13}$ each independently represent a hydrogen atom or a hydrocarbon group having 1 to 11 carbon atoms, $R^{14}$ represents a hydrogen atom or a hydrocarbon group having 1 to 5 carbon atoms, $L^{11}$ represents a hydrocarbon group having 1 to 11 carbon atoms, $R^{15}$ represents a hydrogen atom or a hydrocarbon group having 1 to 11 carbon atoms, $R^{13}$ and $L^{11}$ may be linked to each other to form a ring, $R^{12}$ and $R^{13}$ may be linked to each other to form a ring, and $R^5$ and $L^{11}$ may be linked to each other to form a ring, in Formula (2), $X^{21}$ represents O or $NR^{25}$, $R^{21}$ to $R^{23}$ each independently represent a hydrogen atom or a hydrocarbon group having 1 to 11 carbon atoms, $R^{24}$ represents a hydrogen atom or a hydrocarbon group having 1 to 5 carbon atoms, $L^{21}$ represents a hydrocarbon group having 1 to 11 carbon atoms, $R^{25}$ represents a hydrogen atom or a hydrocarbon group having 1 to 11 carbon atoms, $R^{21}$ and $L^{21}$ may be linked to each other to form a ring, $R^{22}$ and $R^{23}$ may be linked to each other to form a ring, and $R^{25}$ and $L^{21}$ may be linked to each other to form a ring.

<5> The photocurable ink composition according to any one of <1> to <4>, in which the resin has a constitutional unit represented by Formula (3).

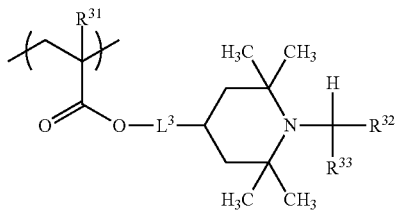

(3)

In Formula (3), $R^{31}$ represents a hydrogen atom or a methyl group, $L^3$ represents a single bond or a divalent hydrocarbon group having 1 to 11 carbon atoms, and $R^{32}$ and $R^{33}$ each independently represent a hydrogen atom or a hydrocarbon group having 1 to 3 carbon atoms.

<6> The photocurable ink composition according to any one of <1> to <5>, in which the resin has a constitutional unit containing an amino group having a cyclic structure and a constitutional unit containing an amino group having a chain structure.

<7> The photocurable ink composition according to <4>, in which the resin has at least one constitutional unit represented by Formula (1) or Formula (2), and a total content of the constitutional unit represented by Formula (1) or (2) is 95% by mass or greater with respect to a total mass of the resin.

<8> The photocurable ink composition according to any one of <1> to <7>, in which at least one terminal structure of the resin is a structure represented by Formula (4).

(4)

In Formula (4), $R^{41}$ represents a hydrocarbon group which may have a branch having 8 to 20 carbon atoms, and the symbol "*" represents a linking portion with respect to a resin.

<9> The photocurable ink composition according to any one of <1> to <8>, in which the radically polymerizable monomers include at least one monomer represented by any of Formulae (5) to (8).

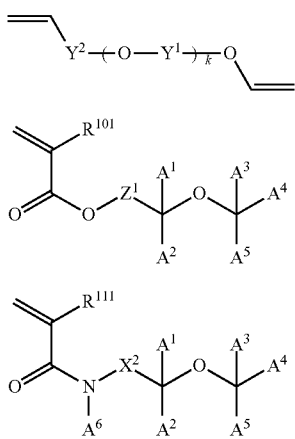

In Formula (5), $Y^1$'s each independently represent an alkylene group having 1 to 10 carbon atoms, $Y^2$ represents a single bond or a carbonyl group, k represents an integer of 1 to 3, in Formulae (6) and (7), $A^1$ to $A^6$ each independently represent a hydrogen atom, an alkyl group, an alkoxy group, or $-L^{101}-(OR^{102})_{nA}-R^{103}$, $L^{101}$ represents a single bond or an alkylene group, $R^{101}$ represents a hydrogen atom or a methyl group, $R^{102}$'s each independently represent an alkylene group, $R^{103}$ represents a hydrogen atom or an alkoxy group, $R^{111}$ represents a hydrogen atom or a methyl group, nA represents an integer of 1 or greater, at least one of $A^1$ to $A^5$ represents a hydrogen atom, any two of $A^1$ to $A^5$ may be bonded to each other to form a ring, and $Z^1$ and $X^2$ each independently represent an alkylene group, a group formed by combining two or more alkylene groups and one or more ether bonds, or a group formed by combining two or more alkylene groups and one or more ester bonds, in Formula (8), $A^7$, $A^9$, and $A^{10}$ each independently represent a hydrogen atom, a methyl group, or an ethyl group, and $A^8$ represents a single bond or a divalent linking group.

<10> The photocurable ink composition according to any one of <1> to <9>, further including: a sensitizer.

<11> The photocurable ink composition according to <10>, in which the sensitizer contains a thioxanthone compound or a benzophenone compound.

<12> The photocurable ink composition according to any one of claims 1 to 11, further including: an antioxidant.

<13> The photocurable ink composition according to any one of <1> to <12>, in which the antioxidant contains a hindered phenol compound having a molecular weight of 1000 or less or a hindered amine compound having a molecular weight of 1000 or less.

<14> The photocurable ink composition according to any one of <1> to <13>, in which a content of a radically polymerizable monomer containing a carboxy group in the radically polymerizable monomers is 1.0 mmol or less per 100 g of the photocurable ink composition.

<15> An image forming method including: an application step of applying the photocurable ink composition according to any one of <1> to <14> onto a recording medium using an ink jet method; and an irradiation step of irradiating the ink composition applied onto the recording medium with active energy rays.

According to an embodiment of the present invention, it is possible to provide a photocurable ink composition from which a cured film with excellent solvent resistance and glossiness can be obtained.

Further, according to another embodiment of the present invention, it is possible to provide an image forming method performed by using the photocurable ink composition.

DESCRIPTION OF THE PREFERRED EMBODIMENTS

Hereinafter, specific embodiments of the present disclosure will be described in detail, but the present disclosure is not particularly limited to the embodiments described below and can be implemented by appropriately adding modifications within the range not obstructing the purpose of the present disclosure.

The numerical ranges shown using "to" in the present specification indicate ranges including the numerical values described before and after "to" as the lower limits and the upper limits.

In the present specification, in a case where a plurality of substances corresponding to respective components in a composition are present, the amount of the respective components in the composition indicates the total amount of the plurality of substances present in the composition unless otherwise noted.

In the present specification, the meaning of the term "step" includes not only an independent step but also a step whose intended purpose is achieved even in a case where the step is not clearly distinguished from other steps.

In the present specification, the "light" has a concept including active energy rays such as γ-rays, β-rays, electron beams, ultraviolet rays, visible light, and infrared rays.

In the present specification, ultraviolet rays are also referred to as "ultraviolet (UV) light."

In the present specification, light generated from light emitting diode (LED) light sources is also referred to as "LED light."

In the present specification, "(meth)acrylic acid" has a concept including both of acrylic acid and methacrylic acid, "(meth)acrylate" has a concept including both of acrylate and methacrylate, and a "(meth)acryloyl group" has a concept including both of an acryloyl group and a methacryloyl group.

In the present specification, ratios of respective structural units in a resin are also referred to as "copolymerization ratios."

A hydrocarbon group such as an alkyl group, an aryl group, an alkylene group, or an arylene group in the present disclosure may be branched or have a ring structure unless otherwise specified.

In the present disclosure, "% by mass" has the same definition as that for "% by weight", and "parts by mass" has the same definition as that for "parts by weight".

Further, in the present disclosure, a combination of two or more preferable aspects is a more preferable aspect.

[Photocurable Ink Composition]

A photocurable ink composition (hereinafter, also simply referred to as an "ink composition") according to the present disclosure includes a resin which contains an amino group having one or more hydrogen atoms on a carbon atom at the α-position and having an amine value of 3.5 mmol/g to 12 mmol/g; and a radically polymerizable monomer, in which the radically polymerizable monomer contains at least one of a monofunctional radically polymerizable monomer or a bifunctional radically polymerizable monomer, the total content of the monofunctional radically polymerizable monomer and the bifunctional radically polymerizable monomer is 50% by mass or greater with respect to the total mass of the photocurable ink composition, and the content of a radically polymerizable monomer containing an acid group in the radically polymerizable monomers is 1.5 mmol or less per 100 g of the photocurable ink composition.

According to the ink composition of the present disclosure, a cured film with excellent solvent resistance and glossiness is obtained.

The reason why a cured film with excellent solvent resistance and glossiness is obtained using the ink composition according to the present disclosure is assumed as follows.

A specific resin which is one component of the ink composition according to the present disclosure is a resin containing an amino group having one or more hydrogen atoms on the carbon atom at the α-position and having an amine value of 3.5 mmol/g to 12 mmol/g.

The specific resin has a carbon atom at the α-position (hereinafter, also referred to as "α-carbon") with respect to a nitrogen atom of the amino group and further has at least one hydrogen atom (hereinafter, also referred to as "α-hydrogen") bonded to this α-carbon.

In the example of Formulae (1) and (2), hydrogen atoms surrounded by circles shown by broken lines indicate α-hydrogen.

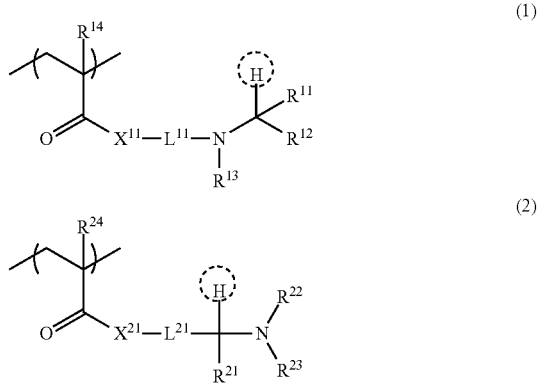

It is considered that the specific resin which contains an amino group having α-hydrogen has a function of suppressing a phenomenon (oxygen inhibition) in which radical polymerization of a radically polymerizable monomer is inhibited by oxygen. Therefore, it is considered that in a case where the ink composition contains a specific resin and a radically polymerizable monomer, radical polymerization of a radically polymerizable monomer is efficiently carried out at the time of irradiation with light, a difference in curing rate between the inside of an ink film and the surface thereof decreases, a stress applied to a cured film generated due to the difference in curing rate decreases, formation of wrinkles and the like is suppressed, and thus a cured film with excellent glossiness is obtained.

Further, in the specific resin which contains an amino group having α-hydrogen, the α-hydrogen of the amino group is cleaved due to the action of oxygen or a polymerization initiator, a radical is generated in the α-carbon of the amino group, and the polymerization of a radically polymerizable monomer proceeds so that a three-dimensional crosslinked structure using the α-carbon of the amino group in the specific resin as one starting point is generated in the cured film. Therefore, the solvent resistance of the cured film to be obtained is considered to be excellent.

Further, it is considered that in a case where the amine value of the specific resin is in a range of 3.5 mmol/g to 12 mmol/g, the number of amino groups in the specific resin is appropriate, the glossiness and the solvent resistance are excellent, the progress of dissolution due to the excessive number of amino groups is also suppressed, and thus the solvent resistance is excellent.

The ink composition according to the present disclosure can be suitably used as an ink composition for ink jet recording.

The ink composition according to the present disclosure may be an ink composition that contains a colorant or a transparent ink composition (also referred to as a "clear ink") that does not contain a colorant.

<Specific Resin>

The ink composition according to the present disclosure contains a resin (specific resin) which contains an amino group having one or more hydrogen atoms on the carbon atom at the α-position and having an amine value of 3.5 mmol/g to 12 mmol/g.

The ink composition according to the present disclosure may contain one or two or more specific resins.

The amine value of the specific resin is in a range of 3.5 mmol/g to 12 mmol/g. From the viewpoints of the glossiness and the solvent resistance of a cured film to be obtained, the amine value thereof is preferably 4 mmol/g or greater, more preferably 4.2 mmol/g or greater, still more preferably 4.5 mmol/g or greater, and particularly preferably 5.0 mmol/g or greater.

Further, from the viewpoint of the solvent resistance of a cured film to be obtained, the amine value of the specific resin is preferably 10 mmol/g or less, more preferably 8 mmol/g or less, and particularly preferably 7.5 mmol/g or less.

The amine value according to the present disclosure is set to be measured according to the following measuring method.

Approximately 0.5 g of a polymer measured using a 100 mL beaker is weighed and a weighed value W1 (g) is recorded. Next, a mixed solution of 54 mL of tetrahydrofuran (THF) and 6 mL of distilled water is added thereto so that the weighed polymer is diluted, thereby obtaining a sample 1 for measuring the amine value.

Titration is performed on the obtained sample 1 for measuring the amine value using a 0.1 N (=0.1 mol/L) hydrochloric acid aqueous solution as a titrant, and the amount of the titrant which has been required up to the equivalence point is recorded as F1 (mL). In a case where a plurality of equivalence points are obtained in the titration, the value of the equivalence point at the maximum titer is used. Here, the "maximum titer F1 (mL)" corresponds to the number of amino groups contained in a polymer.

Amine value (mmol/g)=0.1(mol/L)×$F1$(mL)/$W1$

The "amino group" in the present disclosure includes a secondary amino group and a tertiary amino group as well as a primary amino group and also includes an amino group in the main chain or in a side chain thereof (—N(R)— and the like, R represents a hydrogen atom or an organic group) as well as the amino group at the terminal.

From the viewpoint of the solvent resistance, the amino group in the specific resin is preferably a secondary amino group or a tertiary amino group and more preferably a tertiary amino group.

In addition, it is preferable that the specific resin contains an amino group in a side chain thereof.

In the present disclosure, the "main chain" indicates the relatively longest bonding chain in a molecule of a polymer compound constituting a resin, and the "side chain" indicates a molecular chain branched from the main chain.

The resin structure of the specific resin is not particularly limited, and various resin structures can be used. However, from the viewpoint of the glossiness and the solvent resistance of a cured film to be obtained, an acrylic resin is preferable as the specific resin.

From the viewpoint of the glossiness and the solvent resistance of a cured film to be obtained, it is preferable that the specific resin has a constitutional unit represented by at least one of Formula (1) or Formula (2)

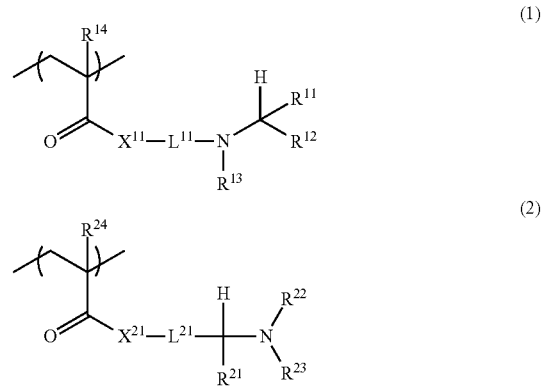

In Formula (1), $X^{11}$ represents O or $NR^{15}$, $R^{11}$ to $R^{13}$ each independently represent a hydrogen atom or a hydrocarbon group having 1 to 11 carbon atoms, $R^{14}$ represents a hydrogen atom or a hydrocarbon group having 1 to 5 carbon atoms, $L^{11}$ represents a hydrocarbon group having 1 to 11 carbon atoms, $R^{15}$ represents a hydrogen atom or a hydrocarbon group having 1 to 11 carbon atoms, $R^{13}$ and $L^{11}$ may be linked to each other to form a ring, $R^{12}$ and $R^{13}$ may be linked to each other to form a ring, and $R^{15}$ and $L^{11}$ may be linked to each other to form a ring, in Formula (2), $X^{21}$ represents O or $NR^{25}$, $R^{21}$ to $R^{23}$ each independently represent a hydrogen atom or a hydrocarbon group having 1 to 11 carbon atoms, $R^{24}$ represents a hydrogen atom or a hydrocarbon group having 1 to 5 carbon atoms, $L^{21}$ represents a hydrocarbon group having 1 to 11 carbon atoms, $R^{25}$ represents a hydrogen atom or a hydrocarbon group having 1 to 11 carbon atoms, $R^{21}$ and $L^{21}$ may be linked to each other to form a ring, $R^{22}$ and $R^{23}$ may be linked to each other to form a ring, and $R^{25}$ and $L^{21}$ may be linked to each other to form a ring.

From the viewpoint of the glossiness, $X^{11}$ in Formula (1) represents preferably O or NH and more preferably O.

From the viewpoint of the glossiness, it is preferable that $R^{11}$ to $R^{13}$ in Formula (1) each independently represent a hydrocarbon group having 1 to 11 carbon atoms. Further, $R^{13}$ and $L^{11}$ may be linked to each other to form a ring, and $R^{12}$ and $R^{13}$ may be linked to each other to form a ring.

From the viewpoint of the curability, it is preferable that $R^{14}$ in Formula (1) represents a hydrogen atom or a methyl group.

From the viewpoint of the glossiness, $L^{11}$ in Formula (1) represents preferably a hydrocarbon group having 2 to 11 carbon atoms, more preferably a hydrocarbon group having 2 to 6 carbon atoms, still more preferably a hydrocarbon group having 2 or 3 carbon atoms, and particularly preferably an ethylene group or a propylene group. Further, $L^{11}$ in Formula (1) may have an ester bond.

From the viewpoint of the glossiness, $X^{21}$ in Formula (2) represents preferably O or NH and more preferably O.

From the viewpoint of the glossiness, it is preferable that $R^{21}$ to $R^{23}$ in Formula (1) each independently represent a hydrocarbon group having 1 to 11 carbon atoms. Further, $R^{23}$ and $L^{21}$ may be linked to each other to form a ring, and $R^{22}$ and $R^{23}$ may be linked to each other to form a ring.

From the viewpoint of the curability, it is preferable that $R^{24}$ in Formula (2) represents a hydrogen atom or a methyl group.

From the viewpoint of the glossiness, $L^{21}$ in Formula (2) represents preferably a hydrocarbon group having 2 to 11 carbon atoms, more preferably a hydrocarbon group having 2 to 6 carbon atoms, still more preferably a hydrocarbon group having 2 or 3 carbon atoms, and particularly preferably an ethylene group or a propylene group. Further, $L^{21}$ in Formula (2) may have an ester bond.

Hereinafter, the constitutional unit represented by Formula (1) and the constitutional unit represented by Formula (2) will also be respectively referred to as the unit (1) and the unit (2).

Similarly, a constitutional unit represented by Formula (X) will also be referred to as a unit (X).

Further, a constitutional unit containing an amino group having one or more hydrogen atoms on the carbon atom at the α-position is also referred to as a constitutional unit A, and a constitutional unit other than the constitutional unit A and a terminal structure described below is also referred to as a constitutional unit B.

From the viewpoint of the glossiness and the solvent resistance of the cured film to be obtained, it is preferable that the specific resin has a constitutional unit represented by Formula (1a), Formula (2b), or Formula (1c) as the constitutional unit A.

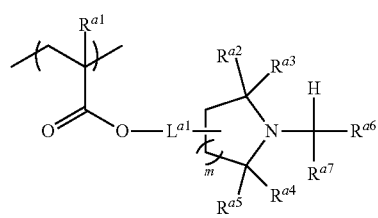
(1a)

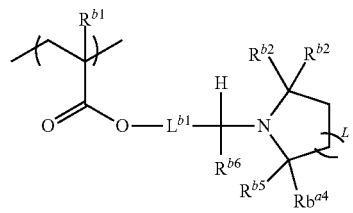
(2b)

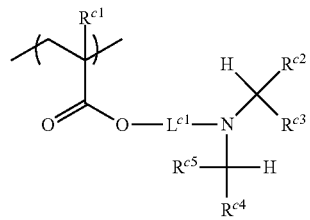
(1c)

In Formula (1a), $R^{a1}$ represents a hydrogen atom or a methyl group, $L^{a1}$ represents a single bond or a divalent hydrocarbon group having 1 to 11 carbon atoms, $R^{a2}$ to $R^{65}$ each independently represent a hydrogen atom or a hydrocarbon group having 1 to 3 carbon atoms, $R^{a6}$ and $R^{a7}$ each independently represent a hydrogen atom or a hydrocarbon group having 1 to 10 carbon atoms, and m represents 1 or 2, in Formula (2b), $R^{b1}$ represents a hydrogen atom or a methyl group, $L^{b1}$ represents a single bond or a divalent hydrocarbon group having 1 to 11 carbon atoms, $R^{b2}$ to $R^{65}$ each independently represent a hydrogen atom or a hydrocarbon group having 1 to 3 carbon atoms, $R^{b6}$ represents a hydrogen atom or a hydrocarbon group having 1 to 10 carbon atoms, and L represents 1 or 2, in Formula (1c), $R^{c1}$ represents a hydrogen atom or a methyl group, $L^{c1}$ represents a divalent hydrocarbon group having 1 to 11 carbon atoms, and $R^{c2}$ to $R^{c5}$ each independently represent a hydrogen atom or a hydrocarbon group having 1 to 10 carbon atoms.

Further, from the viewpoint of the glossiness and the solvent resistance of the cured film to be obtained, it is preferable that the specific resin has a constitutional unit represented by Formula (3).

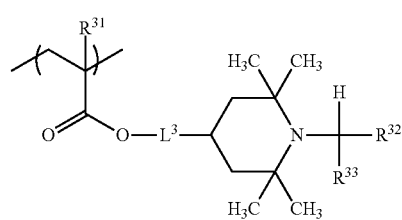
(3)

In Formula (3), $R^{31}$ represents a hydrogen atom or a methyl group, $L^3$ represents a single bond or a divalent hydrocarbon group having 1 to 11 carbon atoms, and $R^{32}$ and $R^{33}$ each independently represent a hydrogen atom or a hydrocarbon group having 1 to 3 carbon atoms.

From the viewpoint of the glossiness and the solvent resistance of the cured film to be obtained, preferred examples of the constitutional unit A include the following constitutional units (1-1) to (1-15).

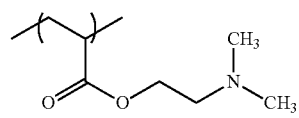
(1-1)

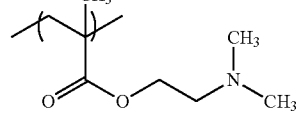
(1-2)

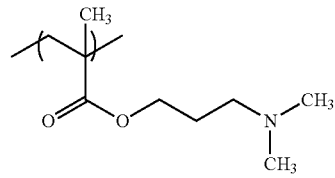
(1-3)

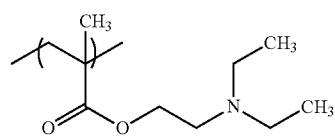
(1-4)

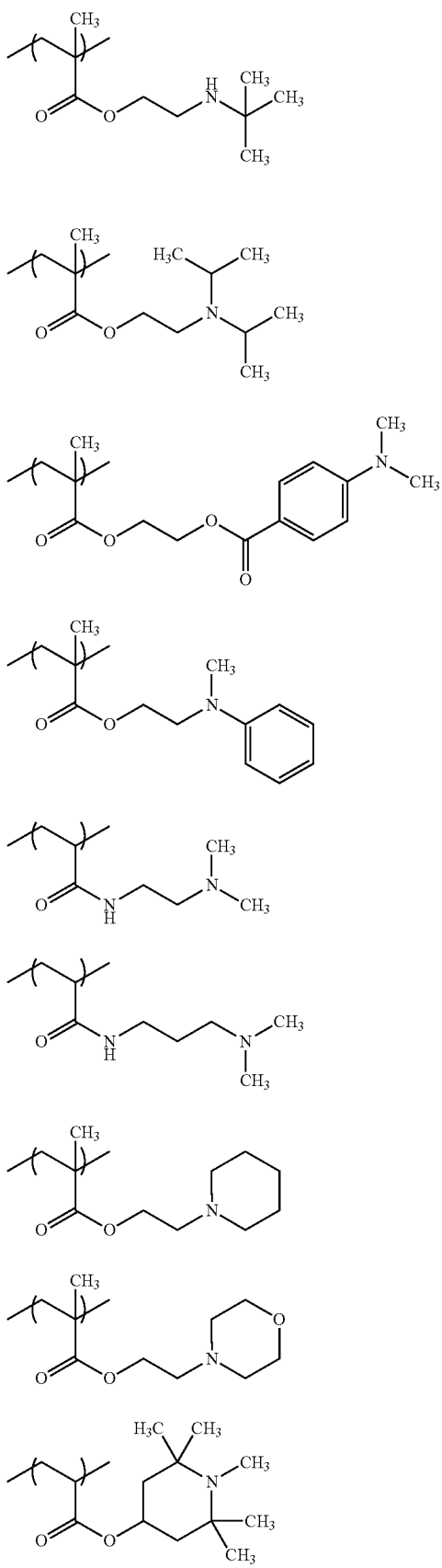
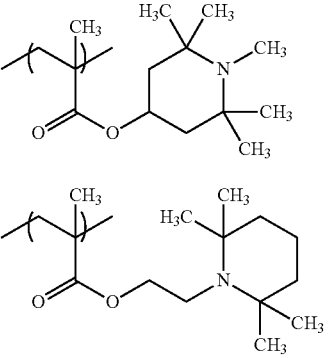

Among these, from the viewpoints of the glossiness and the solvent resistance of the cured film to be obtained, at least one constitutional unit selected from the group consisting of the constitutional units (1-1) to (1-15) is preferable, at least two constitutional units selected from the group consisting of the constitutional units (1-1) to (1-15) is more preferable, at least one constitutional unit selected from the group consisting of the constitutional units (1-1) to (1-10) and at least one constitutional unit selected from the group consisting of the constitutional units (1-11) to (1-15) are still more preferable, and the constitutional unit (1-2) and the constitutional unit (1-14) are particularly preferable, as the constitutional unit A.

From the viewpoints of the adhesiveness of the cured film to be obtained and the blocking resistance, the scratch resistance, and the solvent resistance of the cured film obtained by being cured by an LED light source, it is preferable that the specific resin has a constitutional unit which contains an amino group having a cyclic structure and a constitutional unit which contains an amino group having a chain structure.

In the present disclosure, the "amino group having a cyclic structure" is an amino group in which a nitrogen atom in the amino group is a ring member of the cyclic structure, and the "amino group having a chain structure" is an amino group in which a nitrogen atom in the amino group is not a ring member of the cyclic structure.

As the constitutional unit which contains an amino group having a cyclic structure, a constitutional unit represented by Formula (1a) or (2b) or a constitutional unit represented by Formula (3) is preferably exemplified.

As the constitutional unit which contains an amino group having a chain structure, a constitutional unit represented by Formula (1c) is preferably exemplified.

From the viewpoints of the adhesiveness of the cured film to be obtained and the blocking resistance, the scratch resistance, and the solvent resistance of the cured film obtained by being cured by an LED light source, the contained mass ratio (constitutional unit which contains amino group having cyclic structure:constitutional unit which contains amino group having cyclic structure) of the constitutional unit which contains an amino group having a cyclic structure and the constitutional unit which contains an amino group having a chain structure in the specific resin is preferably in a range of 5:1 to 1:5, more preferably in a range of 4:1 to 1:4, still more preferably in a range of 2:1 to 1:2, and particularly preferably in a range of 1.5:1 to 1:1.5.

As described above, the specific resin may have only one or two or more constitutional units A.

From the viewpoints of the blocking resistance, the solvent resistance, and the glossiness of the cured film to be obtained, the content of the constitutional unit A is preferably 50% by mass or greater, more preferably 70% by mass or greater, still more preferably 85% by mass or greater, and particularly preferably 95% by mass or greater with respect to the total mass of the specific resin.

Further, from the viewpoints of the blocking resistance, the solvent resistance, and the glossiness of the cured film to be obtained, the total content of the constitutional units represented by Formula (1) and Formula (2) is preferably 50% by mass or greater, more preferably 70% by mass or greater, still more preferably 85% by mass or greater, and particularly preferably 95% by mass or greater with respect to the total mass of the specific resin.

Further, from the viewpoints of the glossiness and the solvent resistance of the cured film to be obtained, it is preferable that at least one terminal structure of the specific resin is a structure represented by Formula (4). For example, in a case where the specific resin is a linear resin, the specific resin may have

  (4)

In Formula (4), $R^{41}$ represents a hydrocarbon group which may have a branch having 8 to 20 carbon atoms, and the symbol "*" represents a linking portion with respect to a resin.

From the viewpoint of the glossiness, $R^{41}$ in Formula (4) represents preferably a hydrocarbon group which may have a branch having 8 to 16 carbon atoms more preferably a linear alkyl group having 8 to 16 carbon atoms.

From the viewpoints of the glossiness and the solvent resistance of the cured film to be obtained, the specific resin has preferably at least one structure selected from the group consisting of the following constitutional units (4-1) to (4-19), more preferably at least one structure selected from the group consisting of the following constitutional units (4-3) to (4-11), still more preferably at least one structure selected from the group consisting of the following constitutional units (4-3) to (4-6), and particularly preferably at least one structure selected from the group consisting of the following constitutional units (4-3) to (4-5), as at least one terminal structure.

Further, from the viewpoint of the glossiness, the specific resin has preferably at least one structure selected from the group consisting of the following constitutional units (4-3) to (4-11), more preferably at least one structure selected from the group consisting of the following constitutional units (4-3) to (4-6), and particularly preferably at least one structure selected from the group consisting of the following constitutional units (4-3) to (4-5), as the structure represented by Formula (4).

Further, in the following constitutional units (4-1) to (4-19), the symbol "*" represents a linking portion with respect to the resin.

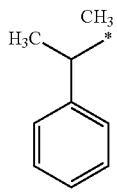  (4-1)

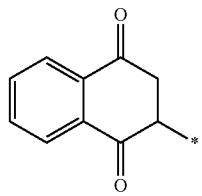  (4-2)

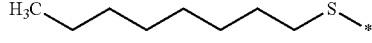  (4-3)

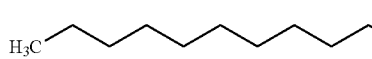  (4-4)

  (4-5)

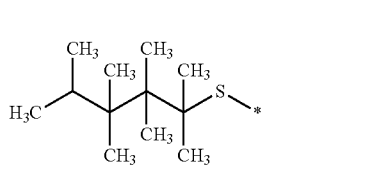  (4-6)

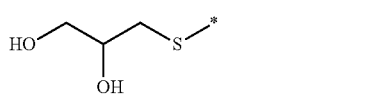  (4-7)

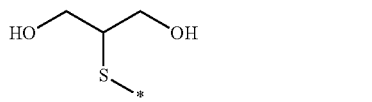  (4-8)

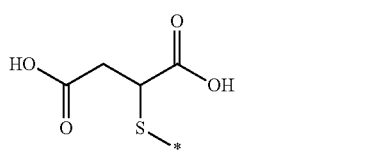  (4-9)

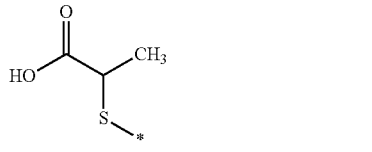  (4-10)

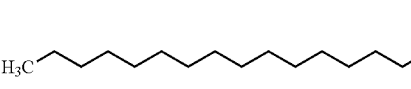  (4-11)

  (4-12)

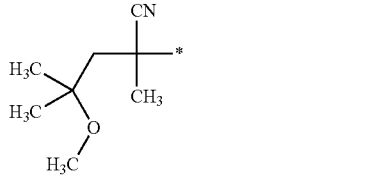  (4-13)

(4-14) 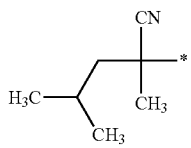

(4-15) 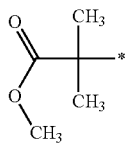

(4-16) 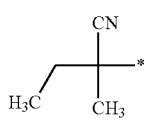

(4-17) 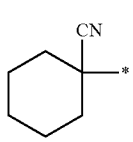

(4-18) 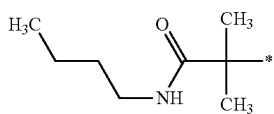

(4-19) 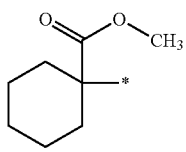

Further, the method of introducing the constitutional units (4-1) to (4-19) to the terminal of the specific resin is not particularly limited, and the introduction can be made by using the following compound as a polymerization initiator or a chain transfer agent during polymerization.

Among examples of the method, it is preferable that at least one structure selected from the group consisting of the constitutional units (4-3) to (4-6) is introduced as at least one terminal structure of the specific resin using at least one compound selected from the group consisting of the following compounds (4-3s) to (4-6s) serving as a chain transfer agent during synthesis of the specific resin.

(4-1s) 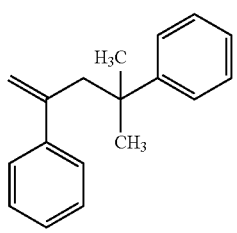

(4-2s) 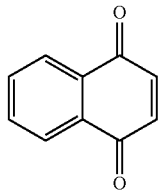

(4-3s) 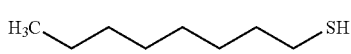

(4-4s) 

(4-5s) 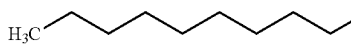

(4-6s) 

(4-7s) 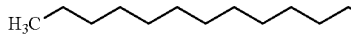

(4-8s) 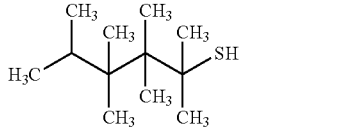

(4-9s) 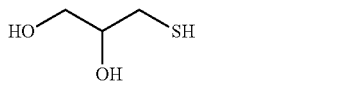

(4-10s) 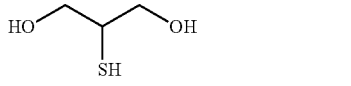

(4-11s) 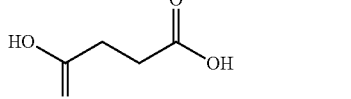

(4-12s) 

(4-13s) 

(4-14s) 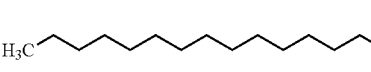

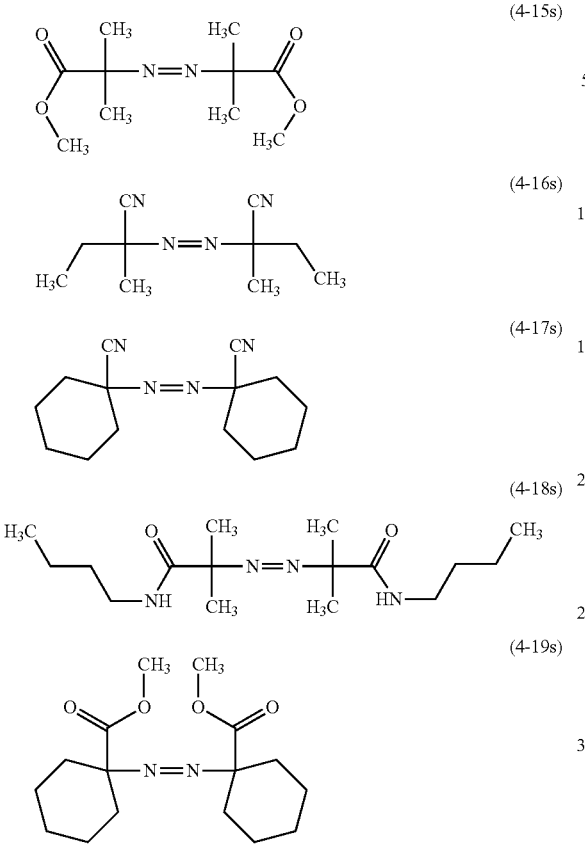

(4-15s)
(4-16s)
(4-17s)
(4-18s)
(4-19s)

Further, the specific resin may have a constitutional unit (constitutional unit B) other than the constitutional unit A and the terminal structure.

The specific resin may not have the constitutional unit B or may have only one or two or more constitutional units B.

From the viewpoints of the blocking resistance, the solvent resistance, and the glossiness of the cured film to be obtained, the content of the constitutional unit B is preferably 50% by mass or less, more preferably 30% by mass or less, and still more preferably 15% by mass or less with respect to the total mass of the specific resin, and it is particularly preferable that the specific resin does not have the constitutional unit B.

Examples of the constitutional unit B include constitutional units represented by any of Formulae (B3) to (B7).

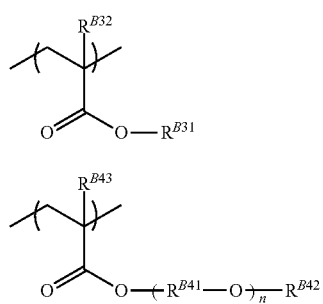

(B3)
(B4)
(B5)
(B6)
(B7)

In Formula (B3), $R^{B31}$ represents a hydrocarbon group which may have a branch having 1 to 11 carbon atoms, and $R^{B32}$ represents a hydrogen atom or a hydrocarbon group having 1 to 5 carbon atoms, in Formula (B4), $R^{B41}$'S each independently represent a hydrocarbon group which may have a branch having 1 to 10 carbon atoms, $R^{B42}$ represents a hydrogen atom or a hydrocarbon group which may have a branch having 1 to 10 carbon atoms, $R^{B43}$ represents a hydrogen atom or a hydrocarbon group having 1 to 5 carbon atoms, and n represents an integer of 1 to 50, in Formula (B5), $Cy^{B51}$ represents a hydrocarbon group having a cyclic structure which may have an oxygen atom with 3 to 15 carbon atoms, $L^{B51}$ represents a single bond or a divalent linking group, and $R^{B51}$ represents a hydrogen atom or a hydrocarbon group having 1 to 5 carbon atoms, in Formula (B6), $R^{B61}$ and $R^{B62}$ each independently represent a hydrogen atom or a hydrocarbon group which may have an oxygen atom with 1 to 11 carbon atoms, $R^{B61}$ and $R^{B62}$ may be linked to each other to form a cyclic structure, and $R^{B63}$ represents a hydrogen atom or a hydrocarbon group having 1 to 5 carbon atoms, in Formula (B7), $R^{B71}$ and $R^{B72}$ each independently represent a hydrogen atom or a hydrocarbon group having 1 to 11 carbon atoms, $R^{B71}$ and $R^{B72}$ may be linked to each other to form a cyclic structure, and $R^{B73}$ represents a hydrogen atom or a hydrocarbon group having 1 to 5 carbon atoms.

In Formula (B3), from the viewpoints of the glossiness and the curability, it is preferable that $R^{B31}$ represents a hydrocarbon group which may have a branch having 1 to 8 carbon atoms, and $R^{B32}$ represents a hydrogen atom or a methyl group.

In Formula (B4), from the viewpoints of the glossiness and the curability, it is preferable that $R^{B41}$ represents a hydrocarbon group which may have a branch having 2 to 4 carbon atoms, $R^{B42}$ represents a hydrogen atom or a hydrocarbon group which may have a branch having 1 to 4 carbon atoms, and $R^{B43}$ represents a hydrogen atom or a methyl group. It is preferable that n represents an integer of 1 to 30.

In Formula (B5), from the viewpoints of the glossiness and the curability, it is preferable that $Cy^{B51}$ represents a hydrocarbon group which has a polycyclic structure having 3 to 15 carbon atoms.

In Formula (B6), from the viewpoints of the glossiness and the curability, it is preferable that $R^{B61}$ and $R^{B62}$ each independently represent a hydrocarbon group which may have an oxygen atom with 1 to 4 carbon atoms, and $R^{B61}$ and $R^{B62}$ may be linked to each other to form a cyclic structure, and it is preferable that $R^{B63}$ represents a hydrogen atom or a methyl group.

From the viewpoints of the glossiness and the curability, it is preferable that the constitutional unit represented by Formula (B7) is a constitutional unit represented by Formula (B7a).

In Formula (B7a), $R^{B73}$ represents a hydrogen atom or a methyl group, and k represents an integer of 1 to 3.

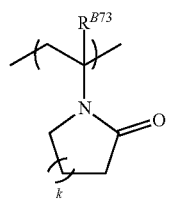
(B7a)

$R^{B31}$ in Formula (B3) represents preferably a hydrocarbon group which may have a branch having 1 to 8 carbon atoms, more preferably a hydrocarbon group which may have a branch having 1 to 4 carbon atoms, and still more preferably a hydrocarbon group which may have a branch having 2 to 4 carbon atoms.

$R^{B32}$ in Formula (B3) represents preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

From the viewpoint of the glossiness, preferred examples of the constitutional unit represented by Formula (B3) include the following constitutional units (B3-1) to (B3-13).

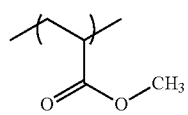
(B3-1)

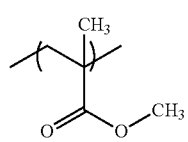
(B3-2)

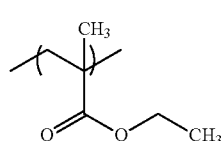
(B3-3)

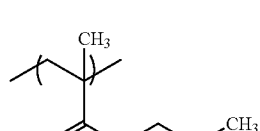
(B3-4)

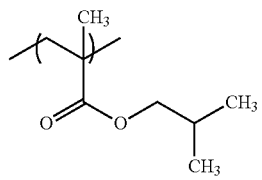
(B3-5)

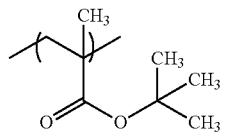
(B3-6)

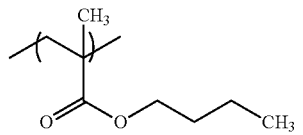
(B3-7)

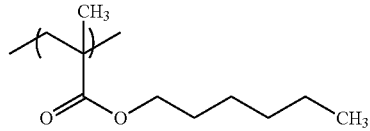
(B3-8)

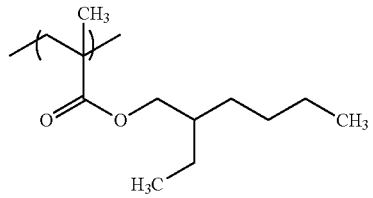
(B3-9)

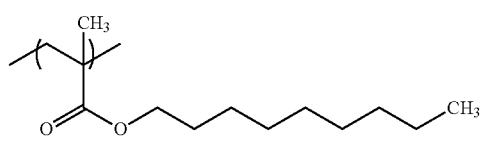
(B3-10)

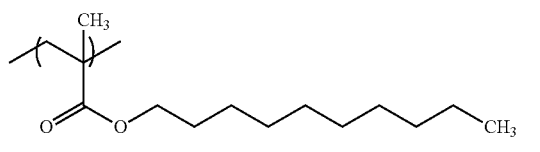
(B3-11)

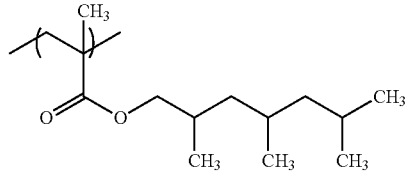
(B3-12)

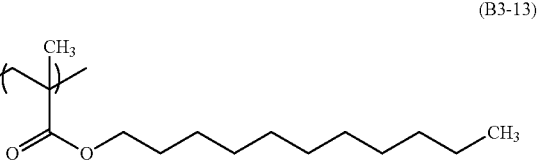
(B3-13)

$R^{B41}$'S in Formula (B4) each independently represent preferably a hydrocarbon group which may have a branch having 2 to 10 carbon atoms, more preferably a hydrocarbon group which may have a branch having 2 to 6 carbon atoms, and still more preferably an ethylene group or a propylene group.

$R^{B42}$ in Formula (B4) represents preferably a hydrocarbon group which may have a branch having 1 to 10 carbon atoms, more preferably a hydrocarbon group which may have a branch having 1 to 4 carbon atoms, and still more preferably a methyl group.

$R^{B43}$ in Formula (B4) represents preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

n in Formula (B4) represents preferably an integer of 1 to 30 and more preferably an integer of 1 to 10.

From the viewpoint of the glossiness, preferred examples of the constitutional unit represented by Formula (B4) include the following constitutional units (B4-1) to (B4-12).

(B4-1)
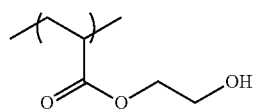

(B4-2)
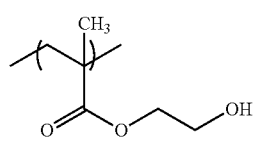

(B4-3)
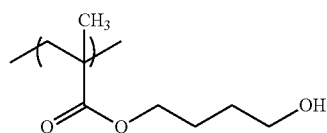

(B4-4)
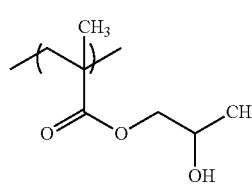

(B4-5)
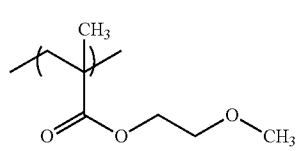

(B4-6)
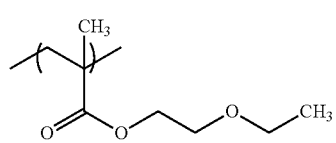

(B4-7)
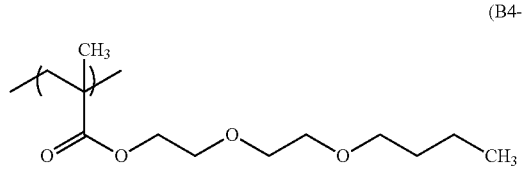

-continued (B4-8)
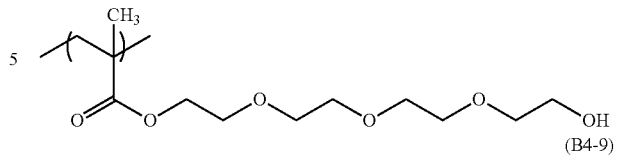

(B4-9)
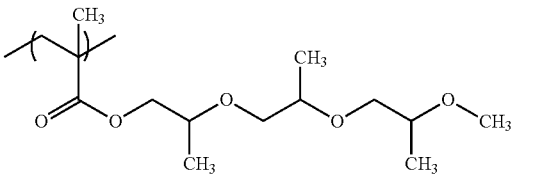

(B4-10)
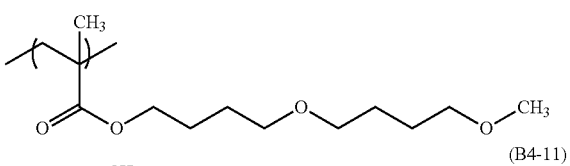

(B4-11)
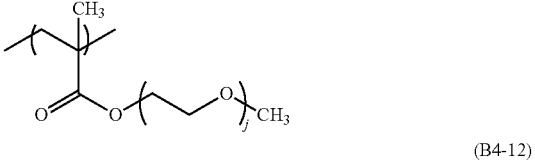

(B4-12)
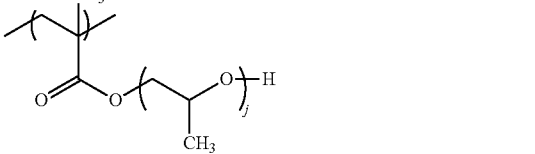

Further, a repetition number j of ethyleneoxy units or propyleneoxy units in the constitutional unit (B4-11) and the constitutional unit (B4-12) is in a range of 1 to 30.

As the divalent linking group, it is preferable that $L^{B51}$ in Formula (B5) represents an alkylene group having 1 to 3 carbon atoms or a group represented by any one of Formulae (L31) to (L34).

(L31)

(L32)

(L33)
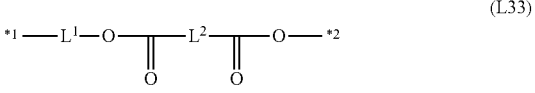

(L34)
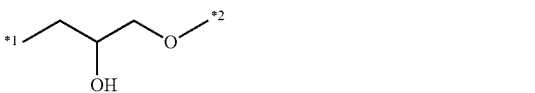

In Formula (L31), L represents an alkylene group having 1 to 3 carbon atoms, n represents an integer of 1 to 4, *1 represents a bonding position with respect to an oxygen atom, and *2 represents a bonding position with respect to $Cy^{B51}$.

In Formula (L32), L represents an alkylene group having 1 to 3 carbon atoms, *1 represents a bonding position with respect to an oxygen atom, and *2 represents a bonding position with respect to $Cy^{B51}$.

In Formula (L33), L1 and L2 each independently represent an alkylene group having 1 to 3 carbon atoms, *1 represents a bonding position with respect to an oxygen atom, and *2 represents a bonding position with respect to $Cy^{B51}$.

In Formula (L34), *1 represents a bonding position with respect to an oxygen atom, and *2 represents a bonding position with respect to $Cy^{B51}$.

n in Formula (L31) is preferably an integer of 1 to 3, more preferably 1 or 2, and particularly preferably 1.

In $Cy^{B51}$, the number of carbon atoms of the hydrocarbon group which may contain an oxygen atom and has a cyclic structure is preferably in a range of 3 to 20, more preferably in a range of 6 to 20, still more preferably in a range of 6 to 12, and particularly preferably in a range of 6 to 10.

Examples of the hydrocarbon group which may contain an oxygen atom and has a cyclic structure include a substituted or unsubstituted aryl group, a substituted or unsubstituted alicyclic group, a substituted or unsubstituted cyclic acetal group, a substituted or unsubstituted cyclic ether group, a substituted or unsubstituted lactone group, and a substituted or unsubstituted heteroaryl group which contains an oxygen atom as a heteroatom. As the substituent groups in the substituted aryl group, the substituted alicyclic group, the substituted cyclic acetal group, the substituted cyclic ether group, the substituted lactone group, and the substituted heteroaryl group, an alkoxy group, an acyl group, an acyloxy group, an alkoxycarbonyl group, a hydroxyl group, and a carboxy group can be respectively exemplified.

Examples of the hydrocarbon group which may contain an oxygen atom and has a cyclic structure include a phenyl group, a naphthyl group, a biphenyl group, a cyclohexyl group, an alkylcyclohexyl group, a norbornyl group, a dicyclopentanyl group, a dicyclopentenyl group, an adamantyl group, a furfuryl group, a hydrofurfuryl group, a cyclic acetal group, a cyclic ether group, and a lactone group.

$R^{B51}$ in Formula (B5) represents preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

A particularly preferable mode of Formula (B5) is that $R^{B51}$ represents a hydrogen atom or an alkyl group having 1 to 3 carbon atoms, $L^{B51}$ represents a single bond, an alkylene group having 1 to 3 carbon atoms, or a group represented by any one of Formulae (L31) to (L34), and $Cy^{B51}$ represents a hydrocarbon group which may contain an oxygen atom, has a cyclic structure, and has 3 to 20 carbon atoms.

Moreover, from the viewpoint of the blocking resistance of and the adhesiveness of the film to a substrate, it is preferable that $Cy^{B51}$ has a polycyclic structure and more preferable that $Cy^{B51}$ has a polycyclic alicyclic structure, as a cyclic structure.

As the constitutional unit represented by Formula (B5), from the viewpoint of the glossiness, the following constitutional units (B5-1) to (B5-13) are preferable, the following constitutional units (B5-4), (B5-7), (B5-8), (B5-9), (B5-10), (B5-11), and (B5-12) are more preferable, and the following constitutional units (B5-9), (B5-10), (B5-11), and (B5-12) are particularly preferable.

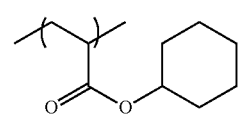

(B5-1)

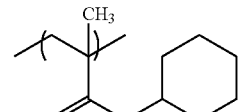

(B5-2)

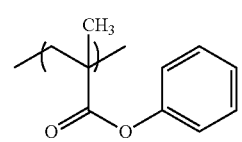

(B5-3)

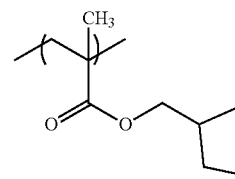

(B5-4)

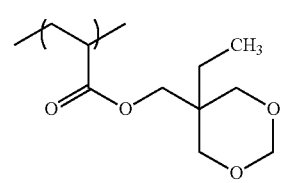

(B5-5)

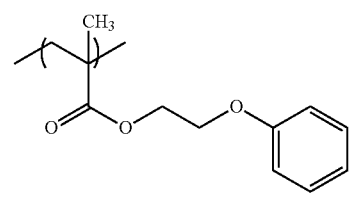

(B5-6)

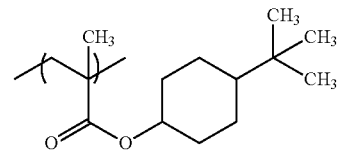

(B5-7)

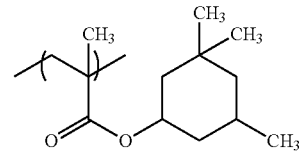

(B5-8)

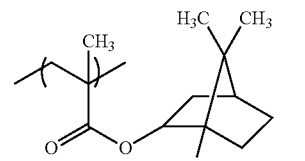

(B5-9)

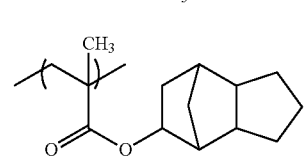

(B5-10)

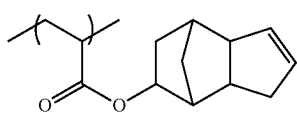
(B5-11)

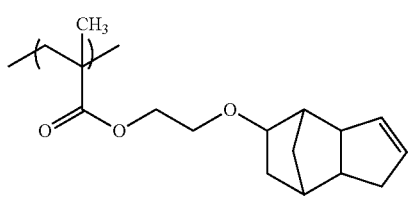
(B5-12)

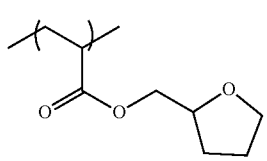
(B5-13)

The number of carbon atoms of the hydrocarbon group which may have an oxygen atom as $R^{B61}$ and $R^{B62}$ in Formula (B6) is preferably in a range of 1 to 6 and more preferably in a range of 1 to 3.

In regard to "the hydrocarbon group which may have an oxygen atom" as $R^{B61}$ and $R^{B62}$ in Formula (B6), examples of the hydrocarbon group having an oxygen atom include a hydrocarbon group substituted with an alkoxy group, a hydrocarbon group substituted with an acyl group, a hydrocarbon group substituted with an acyloxy group, a hydrocarbon group substituted with an alkoxycarbonyl group, a hydrocarbon group substituted with a hydroxyl group, and a hydrocarbon group substituted with a carboxyl group.

As $R^{B61}$ and $R^{B62}$, a hydrocarbon group, which may be substituted with a halogen atom, contain an oxygen atom, and has 1 to 12 carbon atoms, a hydrogen atom, or a hydroxyl group is preferable; a hydrogen atom, a hydroxyl group, an alkyl group having 1 to 12 carbon atoms, a halogenated alkyl group having 1 to 12 carbon atoms (preferably an alkyl chloride group having 1 to 12 carbon atoms), an alkenyl group having 2 to 12 carbon atoms, an acyloxyalkyl group having 3 to 12 carbon atoms, an aryl group having 6 to 12 carbon atoms (such as a phenyl group, a naphthyl group, or a biphenyl group), an aralkyl group having 7 to 12 carbon atoms (such as a benzyl group), or an aryloxyalkyl group having 7 to 12 carbon atoms (such as a phenoxyethyl group) is preferable; a hydrogen atom, an alkyl group having 1 to 12 carbon atoms, or an aryl group having 6 to 12 carbon atoms is more preferable; a hydrogen atom or an alkyl group having 1 to 3 carbon atoms is still more preferable; a hydrogen atom, a methyl group, or an ethyl group is even still more preferable; and a hydrogen atom or a methyl group is particularly preferable.

$R^{B63}$ in Formula (B6) represents preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

In Formula (B6), from the viewpoint of the hardness of the cured film (image) to be obtained, it is preferable that $R^{B61}$ and $R^{B62}$ each independently represent a hydrocarbon group which may have an oxygen atom or $R^{B61}$ and $R^{B62}$ are bonded to each other (in other words, $R^{B61}$ and $R^{B62}$ are integrated with each other) to form a ring.

Further, in a case where $R^{B61}$ and $R^{B62}$ are bonded to each other to form a ring, it is preferable that $R^{B61}$ and $R^{B62}$ represent a group represented by any one of Formulae (N41) to (N44).

(N41)

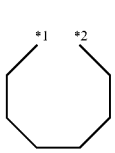
(N42)

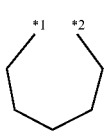
(N43)

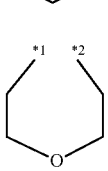
(N44)

In Formulae (N41) to (N44), *1 and *2 represent a bonding position with respect to a nitrogen atom.

A particularly preferable mode of Formula (B6) is that $R^{B61}$ and $R^{B62}$ each independently represent a hydrogen atom or an alkyl group having 1 to 3 carbon atoms or $R^{B61}$ and $R^{B62}$ are bonded to each other and represent a group represented by any one of Formulae (N41) to (N44), and $R^{B63}$ represents a hydrogen atom or an alkyl group having 1 to 3 carbon atoms.

Among such modes, from the viewpoint of the hardness of the cured film to be obtained, a more preferable mode is that $R^{B61}$ and $R^{B62}$ each independently represent an alkyl group having 1 to 3 carbon atoms or $R^{B61}$ and $R^{B62}$ are bonded to each other (in other words, $R^{B61}$ and $R^{B62}$ are integrated with each other) and represent a group represented by any one of Formulae (N41) to (N44).

As the constitutional unit represented by Formula (B6), from the viewpoint of the glossiness, the following constitutional units (B6-1) to (B6-12) are preferable, the following constitutional units (B6-3), (B6-4), (B6-7), (B6-8), (B6-10), (B6-11), and (B6-12) are more preferable, and the following constitutional units (B6-10), (B6-11), and (B6-12) are particularly preferable.

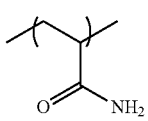
(B6-1)

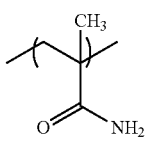
(B6-2)

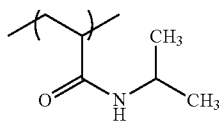
(B6-3)

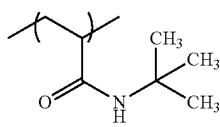
(B6-4)

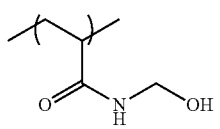
(B6-5)

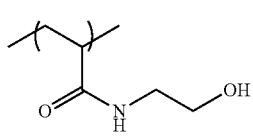
(B6-6)

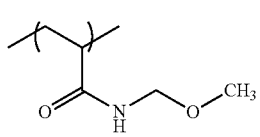
(B6-7)

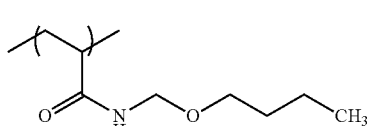
(B6-8)

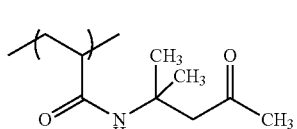
(B6-9)

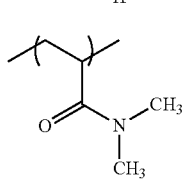
(B6-10)

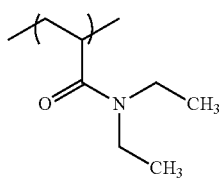
(B6-11)

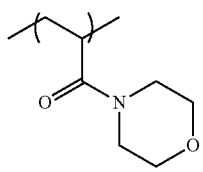
(B6-12)

The number of carbon atoms of the hydrocarbon group as $R^{B71}$ and $R^{B72}$ in Formula (B7) is preferably in a range of 1 to 6 and more preferably in a range of 1 to 3.

From the viewpoint of the hardness of a film, it is preferable that $R^{B71}$ and $R^{B72}$ in Formula (B7) each independently represent a hydrocarbon group or $R^{B71}$ and $R^{B72}$ are bonded to each other (in other words, $R^{B71}$ and $R^{B72}$ are integrated with each other) to form a ring.

Further, in a case where $R^{B71}$ and $R^{B72}$ are bonded to each other to form a ring, it is particularly preferable that the group formed by $R^{B71}$ and $R^{B72}$ being integrated is a group represented by Formula (N51) or (N52).

(N51)

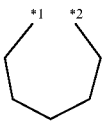
(N52)

In Formula (N51) or (N52), *1 represents a binding position with respect to a nitrogen atom, and *2 represents a binding position with respect to a carbon atom.

$R^{B73}$ in Formula (B7) represents preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

A particularly preferable mode of Formula (B7) is that $R^{B71}$ and $R^{B72}$ each independently represent a hydrogen atom or an alkyl group having 1 to 6 carbon atoms or $R^{B71}$ and $R^{B72}$ are bonded to each other (in other words, $R^{B71}$ and $R^{B72}$ are integrated with each other) and represent a group represented by Formula (N51) or (N52), and $R^{B73}$ represents a hydrogen atom or an alkyl group having 1 to 3 carbon atoms (preferably a hydrogen atom).

Among such modes, from the viewpoint of the hardness of the cured film to be obtained, a more preferable mode is that $R^{B71}$ and $R^{B72}$ each independently represent an alkyl group having 1 to 6 carbon atoms or $R^{B71}$ and $R^{B72}$ are bonded to each other and represent a group represented by Formula (N51) or (N52).

From the viewpoint of the glossiness, preferred examples of the constitutional unit represented by Formula (B7) include the following constitutional units (B7-1) to (B7-5).

(B7-1)

(B7-2)

(B7-3)

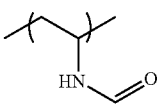

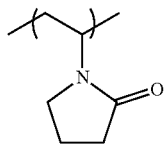

(B7-4)

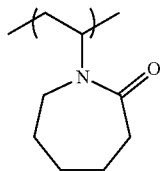

(B7-5)

Further, from the viewpoint of the glossiness, as the constitutional unit represented by Formula (B7), the constitutional unit (B7a) is preferable, and at least one constitutional unit selected from the group consisting of the constitutional units (B7-4) and (B7-5) is particularly preferable.

Further, as the constitutional unit B, for example, a constitutional unit derived from a vinyl monomer other than the above-described constitutional units can be appropriately selected and used.

The weight-average molecular weight (Mw) of the specific resin is not particularly limited, but is preferably in a range of 1000 to 100000 and more preferably in a range of 5000 to 30000, from the viewpoint of the glossiness.

From the viewpoint of the hardness of the film, the weight-average molecular weight (Mw) of the specific resin is preferably 1000 or greater, more preferably 2000 or greater, still more preferably 3000 or greater, and particularly preferably 5000 or greater.

From the viewpoints of the storage stability and the jetting stability, the weight-average molecular weight (Mw) of the specific resin is preferably 50000 or less, more preferably 40000 or less, and particularly preferably 30000 or less.

In the present specification, the weight-average molecular weight (Mw) indicates a value measured by gel permeation chromatography (GPC).

The measurement according to gel permeation chromatography (GPC) is performed using HLC (registered trademark)-8020GPC (manufactured by Tosoh Corporation) as a measuring device; three of TSK gel (registered trademark) Super Multipore HZ-H (4.6 mmID×15 cm, manufactured by Tosoh Corporation) as columns; and tetrahydrofuran (THF) as an eluent. Moreover, the measurement is performed using a differential refractive index (RI) detector under the conditions of a sample concentration of 0.45% by mass, a flow rate of 0.35 ml/min, a sample injection amount of 10 μl, and a measurement temperature of 40° C.

The calibration curve is prepared from eight samples of "standard samples TSK standard, polystyrene" (manufactured by Tosoh Corporation): "F-40," "F-20," "F-4," "F-1," "A-5000," "A-2500," "A-1000," and "n-propylbenzene."

From the viewpoints of the glossiness and the solvent resistance of the cured film to be obtained, the content of the specific resin is preferably in a range of 0.5% by mass to 10% by mass and more preferably in a range of 1% by mass to 8% by mass with respect to the total mass of the ink composition.

Further, from the viewpoint of the hardness of the cured film to be obtained, the content of the specific resin is preferably 0.5% by mass or greater, more preferably 1.0% by mass or greater, still more preferably 1.5% by mass or greater, and particularly preferably 2.0% by mass or greater with respect to the total amount of the ink composition.

Further, from the viewpoints of the storage stability and the jetting stability, the content of the specific resin is preferably 10.0% by mass or less, more preferably 9.0% by mass or less, still more preferably 8.0% by mass or less, and particularly preferably 7.0% by mass or less with respect to the total mass of the ink composition.

<Radically Polymerizable Monomer>

The ink composition of the present disclosure contains a radically polymerizable monomer (hereinafter, also simply referred to as a "polymerizable monomer"). Only one or two or more kinds of the polymerizable monomers may be contained in the ink composition.

The preferable range of the content of the polymerizable monomer based on the total amount of the ink composition is as described above. It is preferable that a compound having at least one ethylenically unsaturated bond in a molecule is used as the polymerizable monomer.

As the polymerizable monomer, known polymerizable monomers described in the paragraphs 0108 to 0137 of JP2011-225848A, the paragraphs 0150 to 0188 of JP2009-139852A, and the paragraphs 0122 to 0127 of JP2009-209352A can be used.

As the polymerizable monomer, a monofunctional polymerizable monomer, a polyfunctional polymerizable monomer, or a combination of a monofunctional polymerizable monomer and a polyfunctional polymerizable monomer may be used.

The monofunctional polymerizable monomer is advantageous in terms of the jetting stability and a decrease in viscosity of the ink composition.

The polyfunctional polymerizable monomer is advantageous in terms of the hardness of a film.

Examples of the monofunctional polymerizable monomer include an N-vinyl compound such as N-vinylcaprolactam or N-vinylpyrrolidone; a monofunctional acrylate compound such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethyl cyclohexyl acrylate (TMCHA), dicyclopentenyl acrylate (DCPA), 4-t-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxy polyethylene glycol acrylate, or nonylphenoxy polypropylene glycol acrylate; a monofunctional methacrylate compound such as 2-phenoxyethyl methacrylate, benzyl methacrylate, isobornyl methacrylate, tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethyl cyclohexyl methacrylate, dicyclopentenyl methacrylate, 4-t-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxy polyethylene glycol methacrylate, or nonylphenoxy polypropylene glycol methacrylate; a monofunctional vinyl ether compound such as N-propyl vinyl ether, isopropyl vinyl ether, N-butyl vinyl ether, isobutyl vinyl ether, 2-ethylhexyl vinyl ether, cyclohexyl vinyl ether, 2-hydroxy ethyl vinyl ether, 4-hydroxybutyl vinyl ether, or cyclohexane dimethanol monovinyl ether; a monofunctional acrylamide compound such as acrylamide, N,N-diemthylacrylamide, N,N- diethylacrylamide, acryloylmorpholine, N-isopropylacrylamide, N-hydroxyethyl acrylamide, N-butyl acrylamide, N-tert-butyl acrylamide, N-(1,1-dimethyl-3-oxobutyl)acrylamide, N-dodecyl acrylamide, or N-(buthoxymethyl)acrylamide; and a monofuctional methacrylamide compound such as methacrylamide, N-phenylmethacrylamide, N-(methoxymethyl)methacrylamide, N,N-dimethylmethacrylate, or N-tert-butylmethacrylamide.

Examples of the polyfunctional polymerizable monomer include a polyfunctional acrylate compound such as hexanediol diacrylate (HDDA), dipropylene glycol diacrylate (DPGDA), polyethylene glycol diacrylate, polypropylene glycol diacrylate, pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, or tricyclodecane dimethanol diacrylate; 2-(2-vinyloxyethoxy) ethylacrylate (VEEA); a polyfunctional vinyl compound such as 1,4-butanediol divinyl ether, cyclohexanedimethanol divinyl ether, diethylene glycol divinyl ether, or triethylene glycol divinyl ether (DVE3); and a polyfunctional methacrylate compound such as hexanediol dimethacrylate, dipropylene glycol dimethacrylate (DPGDMA), polyethylene glycol dimethacrylate, polypropylene glycol dimethacrylate, pentaerythritol trimethacrylate, pentaerythritol tetramethacrylate, neopentyl glycol dimethacrylate, or polyethylene glycol-modified bisphenol A dimethacrylate.

In addition to the above-described polymerizable compounds, commercially available products described in "Cross-linking Agent Handbook" (1981, edited by Shinzo Yamashita, published by Taiseisha, Ltd.), "UV.EB Curing Handbook (part of raw materials)" (1985, edited by Kiyoshi Kato, published by Kobunshi Kankokai), "Application and Market of UV.EB Curing Technology" (pp. 79, 1989, edited by Rad Tech Japan, CMC Publishing Co., Ltd.), "Polyester Resin Handbook" (1988, written by Eiichiro Takiyama, published by Nikkan Kogyo Shimbun, Ltd.); and a radically polymerizable monomer which is known in the field can be used.

As polymerizable monomers, commercially available products on the market may be used. Examples of the commercially available products of the polymerizable monomers include ethoxylated or propoxylated acrylate such as AH-600, AT-600, UA-306H, UA-306T, UA-306I, UA-510H, UF-8001G DAUA-167 (all manufactured by KYOEISHA CHEMICAL Co., LTD.), SR444, SR454, SR492, SR499, CD501, SR502, SR9020, CD9021, SR9035, SR494 (all manufactured by Sartomer Company), and an isocyanuric monomer such as A-9300, A-9300-1CL (both manufactured by Shin-Nakamura Chemical Co., Ltd.).

Moreover, other commercially available products of the polymerizable monomers include neopentyl glycol propylene oxide adduct diacrylate (NPGPODA, manufactured by Sartomer Company), dipentaerythritol pentaacrylate (SR399E, manufactured by Sartomer Company), pentaerythritol triacrylate (ATMM-3L, manufactured by Shin-Nakamura Chemical Co., Ltd.), and dipentaerythritol hexaacrylate (A-DPH, manufactured by Shin-Nakamura Chemical Co., Ltd.).

The weight-average molecular weight of the polymerizable monomer is preferably 100 or greater and less than 1,000, more preferably in a range of 100 to 800, and still more preferably in a range of 150 to 700.

The weight-average molecular weight of the polymerizable monomer is a value measured by gel permeation chromatography (GPC).

Further, from the viewpoints of the glossiness and the solvent resistance of the cured film to be obtained, it is preferable that the radically polymerizable monomers include at least one monomer represented by any of Formulae (5) to (8) and more preferable that the radically polymerizable monomers include at least one monomer represented by Formula (5), (6), or (8).

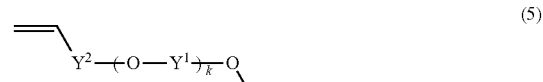

(5)

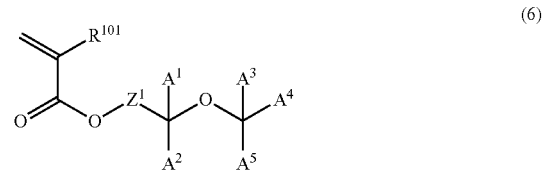

(6)

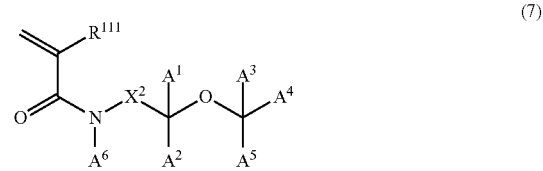

(7)

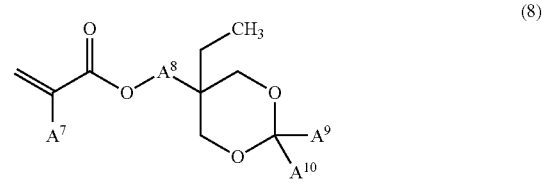

(8)

In Formula (5), $Y^1$'s each independently represent an alkylene group having 1 to 10 carbon atoms, $Y^2$ represents a single bond or a carbonyl group, and k represents an integer of 1 to 3, in Formulae (6) and (7), $A^1$ to $A^6$ each independently represent a hydrogen atom, an alkyl group, an alkoxy group, or -$L^{101}$-$(OR^{102})_{nA}$—$R^{103}$, $L^{101}$ represents a single bond or an alkylene group, $R^{101}$ represents a hydrogen atom or a methyl group, $R^{102}$'s each independently represent an alkylene group, $R^{103}$ represents a hydrogen atom or an alkoxy group, $R^{111}$ represents a hydrogen atom or a methyl group, nA represents an integer of 1 or greater, at least one of $A^1$ to $A^5$ represents a hydrogen atom, any two of $A^1$ to $A^5$ may be bonded to each other to form a ring, and $Z^1$ and $X^2$ each independently represent an alkylene group, and a group formed by combining two or more alkylene groups and one or more ether bonds, or a group formed by combining two or more alkylene groups and one or more ester bonds, in Formula (8), $A^7$, $A^9$, and $A^{10}$ each independently represent a hydrogen atom, a methyl group, or an ethyl group, and $A^8$ represents a single bond or a divalent linking group.

$Y^1$'s in Formula (5) each independently represent an alkylene group having 2 to 10 carbon atoms, more preferably an alkylene group having 2 to 6 carbon atoms, and an alkylene group having 2 or 3 carbon atoms.

It is preferable that $Y^2$ in Formula (5) represents a single bond.

In Formulae (6) and (7), it is preferable that any two of A1 to A5 are bonded to each other to form a ring.

Further, in Formulae (6) and (7), $Z^1$ and $X^2$ each independently represent preferably an alkylene group or a group formed by combining two or more alkylene groups and one or more ether groups, more preferably an alkylene group, and particularly preferably a methylene group.

$A^7$ in Formula (8) represents preferably a hydrogen atom or a methyl group and more preferably a hydrogen atom.

The divalent linking group as $A^8$ in Formula (8) is not particularly limited as long as the effects of the present disclosure are not significantly damaged, but is preferably a divalent hydrocarbon group or a divalent group formed by combining a hydrocarbon group and an ether bond and more preferably a divalent hydrocarbon group, a poly(alkyleneoxy) group, or a poly(alkyleneoxy)alkyl group. Further, the number of carbon atoms in the divalent linking group is preferably in a range of 1 to 60 and more preferably in a range of 1 to 20.

$A^8$ in Formula (8) represents preferably a single bond, a divalent hydrocarbon group, or a divalent group formed by combining a hydrocarbon group and an ether bond, more preferably a divalent hydrocarbon group having 1 to 20 carbon atoms, still more preferably a divalent hydrocarbon group having 1 to 8 carbon atoms, and particularly preferably a methylene group.

$A^9$ and $A^{10}$ in Formula (8) each independently represent preferably a hydrogen atom or a methyl group and more preferably a hydrogen atom, and it is still more preferable that both of $A^9$ and $A^{10}$ represent a hydrogen atom.

From the viewpoint of the glossiness, it is preferable that the radically polymerizable monomers include at least one monomer selected from the group consisting of cyclic trimethylolpropane formal acrylate (CTFA), tetrahydrofurfuryl acrylate (THFA), and acryloyl morpholine (ACMO) and more preferable that the radically polymerizable monomers include cyclic trimethylolpropane formal acrylate.

Further, the radically polymerizable monomer contained in the ink composition according to the present disclosure may be used alone or in combination of two or more kinds thereof.

It is preferable that the radically polymerizable monomers include at least one monofunctional radically polymerizable monomer (in the present specification, also referred to as a "monofunctional monomer").

In a case where the radically polymerizable monomers include a monofunctional radically polymerizable monomer, the compatibility between the specific resin and the radically polymerizable monomer is improved, and the storage stability and the jetting stability are improved.

In the ink composition, from the viewpoint of the hardness of the film, it is preferable that the radically polymerizable monomers include a polyfunctional radical polymerizable monomer (in the present specification, also referred to as a "polyfunctional monomer").

The radically polymerizable monomers include at least one of a monofunctional radically polymerizable monomer or a bifunctional radically polymerizable monomer, and the total content of the monofunctional radically polymerizable monomer and the bifunctional radically polymerizable monomer is 50% by mass or greater with respect to the total mass of the photocurable ink composition. With the above-described mode, the glossiness becomes excellent.

The content of the radically polymerizable monomer containing an acid group in the ink composition according to the present disclosure is 1.5 mmol or less in terms of the molar number per 100 g of the photocurable ink composition, preferably 0.5 mmol or less, more preferably 0.1 mmol or less, and still more preferably 0.01 mmol or less from the viewpoint of the glossiness, and it is particularly preferable that the ink composition does not contain a radically polymerizable monomer containing an acid group.

Further, the content of the radically polymerizable monomer containing a carboxy group in the ink composition according to the present disclosure is preferably 1.0 mmol or less, more preferably 0.5 mmol or less, still more preferably 0.1 mmol or less, and particularly preferably 0.01 mmol or less in terms of the molar number per 100 g of the photocurable ink composition from the viewpoint of the glossiness, and it is most preferable that the ink composition does not contain a radically polymerizable monomer containing a carboxy group.

Further, the content of the radically polymerizable monomer containing an acid group in the photocurable ink composition according to the present disclosure is preferably 1% by mass or less, more preferably 0.1% by mass or less, still more preferably 0.01% by mass or less with respect to the total mass of the ink composition from the viewpoint of the glossiness, and it is most preferable that the ink composition does not contain a radically polymerizable monomer containing an acid group.

The content of the radically polymerizable monomer containing an acid group in the radically polymerizable monomers is preferably less than 20% by mole. From the viewpoint of the glossiness, the content thereof is preferably less than 10% by mole, more preferably less than 2% by mole, still more preferably less than 1% by mole, and even still more preferably 0% by mole with respect to the molar number of the amino group in the specific resin contained in the photocurable ink composition. In other words, it is particularly preferable that the ink composition according to the present disclosure does not contain a radically polymerizable monomer containing an acid group.

In a case where the content thereof is in the above-described range, the action of the amino group and the α-hydrogen thereof in the specific resin is unlikely to be disturbed due to the acid group of the radically polymerizable monomer containing an acid group, and thus a cured film with excellent glossiness can be formed.

In addition, the molar number of the amino group in the specific resin according to the present disclosure is calculated from the amine value.

The radically polymerizable monomer containing an acid group according to the present disclosure indicates a radical polymerizable monomer containing a group that has dissociable protons with a pKa of less than 11.

Examples of the group that has dissociable protons with a pKa of less than 11 include a carboxy group, a sulfonic acid group, a phenolic hydroxyl group, a phosphoric acid group, a phosphonic acid group, an aminosulfonyl group, an acetylacetonate group, and active imide groups described in paragraphs 0019 to 0043 in JP2005-107112A.

From the viewpoint of the glossiness, it is particularly preferable that the ink composition according to the present disclosure does not contain a radically polymerizable monomer containing a carboxy group.

Specific examples of the radically polymerizable monomer containing an acid group include 2-(meth)acryloxyethylsuccinic acid, methacrylic acid, and the following monomers.

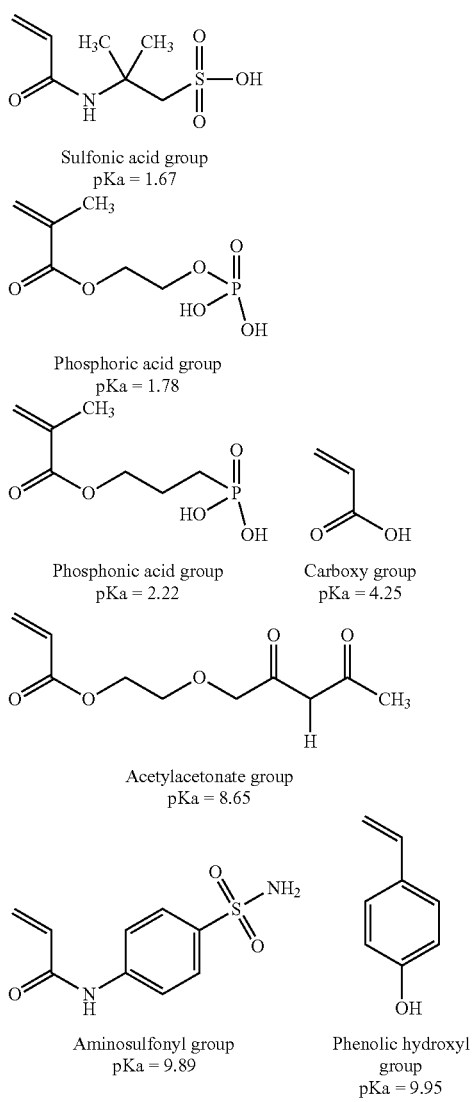

Sulfonic acid group
pKa = 1.67

Phosphoric acid group
pKa = 1.78

Phosphonic acid group
pKa = 2.22

Carboxy group
pKa = 4.25

Acetylacetonate group
pKa = 8.65

Aminosulfonyl group
pKa = 9.89

Phenolic hydroxyl group
pKa = 9.95

Further, from the viewpoints of the glossiness and the curability, the content of the radically polymerizable monomer is preferably 50% by mass or greater, more preferably 60% by mass or greater, and particularly preferably 65% by mass or greater with respect to the total mass of the ink composition.

The upper limit of the content of the radically polymerizable monomer is not particularly limited, but is preferably 95% by mass or less and more preferably 90% by mass or less with respect to the total mass of the ink composition.

<Radically Polymerizable Resin>

The ink composition of the present disclosure can contain a radically polymerizable resin (hereinafter, also simply referred to as a "polymerizable resin"). In this case, only one kind or two or more kinds of the polymerizable resins may be contained in the ink composition.

In a case where the ink composition of the present disclosure contains a radically polymerizable resin, the effects of the above-described structural unit A (effects of suppressing a phenomenon in which radical polymerization is inhibited by oxygen) are exhibited with respect to radical polymerization of the radically polymerizable monomer and radical polymerization of the radically polymerizable resin.

Here, the polymerizable resin indicates a resin including a polymerizable group.

The concept of the polymerizable resin includes an oligomer including a polymerizable group and a polymer including a polymerizable group.

Examples of the resin which is the base of the polymerizable resin include an acrylic resin, a urethane resin, a polyester resin, a polyether resin, a polycarbonate resin, an epoxy resin, and a polybutadiene resin. Among these, from a viewpoint of reducing curing contraction, a resin which includes both of a hard segment and a soft segment and in which the stress at the time of curing can be relaxed is preferable and at least one resin selected particularly from a urethane resin, a polyester resin, and an epoxy resin is more preferable.

As the polymerizable group contained in the polymerizable resin, a group including an ethylenic double bond is preferable and a group including at least one of a vinyl group and a 1-methylvinyl group is more preferable.

From the viewpoint of polymerization reactivity and the hardness of a film to be formed, a (meth)acryloyl group is particularly preferable as the polymerizable group.

These polymerizable groups can be introduced into a resin (a polymer or an oligomer) through a polymer reaction or copolymerization.

For example, a polymerizable group can be introduced into a polymer (or an oligomer) using a reaction of a polymer (or an oligomer) including a carboxy group in the side chain thereof with glycidyl methacrylate or a reaction of a polymer (or an oligomer) including an epoxy group with ethylenically unsaturated group-containing carboxylic acid such as methacrylic acid. These groups may be used in combination.

As the polymerizable resin, commercially available products in the market may be used.

Examples of the commercially available products of the acrylic resin including a polymerizable group include (ACA)Z200M, (ACA)Z230AA, (ACA)Z251, (ACA)Z254F (all manufactured by DAICEL-ALLNEX. LTD.), and HITALOID 7975D (manufactured by Hitachi Chemical Co., Ltd.).

Examples of the commercially available products of the urethane resin including a polymerizable group include EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, KRM 8528 (all manufactured by DAICEL-ALLNEX. LTD.), CN964, CN9012, CN968, CN996, CN975, CN9782 (all manufactured by Sartomer Company), UV-6300B, UV-7600B, UV-7605B, UV-7620EA, UV-7630B (all manufactured by Nippon Synthetic Chemical Industry Co., Ltd.), U-6HA, U-15HA, U-108A, U-200PA, UA-4200 (all manufactured by Shin-Nakamura Chemical Co., Ltd.), TESLAC 2300, HITALOID 4863, TESLAC 2328, TESLAC 2350, HITALOID 7902-1 (all manufactured by Hitachi Chemical Co., Ltd.), 8UA-017, 8UA-239, 8UA-239H, 8UA-140, 8UA-585H, 8UA-347H, and 8UX-015A (all manufactured by TAISEI FINE CHEMICAL CO., LTD.).

Examples of the commercially available products of the polyester resin including a polymerizable group include CN294, CN2254, CN2260, CN2271E, CN2300, CN2301, CN2302, CN2303, CN2304 (all manufactured by Sartomer Company), EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all manufactured by DAICEL-ALLNEX. LTD.).

Examples of the commercially available products of the polyether resin including a polymerizable group include BLEMMER (registered trademark) ADE-400A and BLEMMER (registered trademark) ADP-400 (both manufactured by NOF CORPORATION).

Examples of the commercially available products of the polycarbonate resin including a polymerizable group include polycarbonate diol diacrylate (manufactured by Ube Industries, Ltd.).

Examples of the commercially available products of the epoxy resin including a polymerizable group include EBECRYL (registered trademark) 3708 (manufactured by DAICEL-ALLNEX. LTD.), CN120, CN120B60, CN120B80, CN120E50 (all manufactured by Sartomer Company), and HITALOID 7851 (manufactured by Hitachi Chemical Co., Ltd.).

Examples of the commercially available products of the polybutadiene resin including a polymerizable group include CN301, CN303, and CN307 (all manufactured by Sartomer Company).

From the viewpoint of balancing the adhesiveness and the dispersion stability, the weight-average molecular weight of the polymerizable resin is preferably in a range of 1,000 to 100,000, more preferably in a range of 1,000 to 40,000, and still more preferably in a range of 1,000 to 10,000.

The weight-average molecular weight of the polymerizable resin is a value measured by gel permeation chromatography (GPC).

In a case where the ink composition of the present disclosure contains a polymerizable resin, from the viewpoint of effectively exhibiting the effects of the present disclosure, the content of the polymerizable resin is preferably in a range of 0.1% by mass to 10% by mass, more preferably in a range of 0.3% by mass to 5.0% by mass, and particularly preferably in a range of 1.0% by mass to 3.0% by mass based on the total mass of the ink composition.

<Photopolymerization Initiator>

It is preferable that the ink composition of the present disclosure contains a photopolymerization initiator.

In a case where the ink composition of the present disclosure contains a photopolymerization initiator, one kind or two or more kinds of the photopolymerization initiators may be contained.

A known photopolymerization initiator which absorbs light (that is, active energy rays) and generates a radical that is a polymerization initiator species can be used as a photopolymerization initiator.

Preferred examples of the photopolymerization initiator include (a) carbonyl compounds such as aromatic ketones, (b) an acyl phosphine oxide compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

The compounds of (a) to (m) described above may be used alone or in combination of two or more kinds thereof for these photopolymerization initiators.

As preferred examples of (a) the carbonyl compound, (b) the acylphosphine oxide compound, and (e) the thio compound, compounds having a benzophenone skeleton or a thioxanthone skeleton described in "RADIATION CURING IN POLYMER SCIENCE AND TECHNOLOGY," J. P. FOUASSIER, J. F. RABEK (1993), pp. 77 to 117 are exemplified.

More preferred examples thereof include an α-thiobenzophenone compound described in JP1972-006416B (JP-S47-006416B), a benzoin ether compound described in JP1972-003981B (JP-S47-003981B), an α-substituted benzoin compound described in JP1972-022326B (JP-S47-022326B), a benzoin derivative described in JP1972-023664B (JP-S47-023664B), aroyl phosphonate ester described in JP1982-030704A (JP-S57-030704A), dialkoxybenzophenone described in JP1985-026483B (JP-S60-026483B), benzoin ethers described in JP1985-026403B (JP-S60-026403B) and JP1987-081345A (JP-S62-081345A), α-aminobenzophenones described in JP1989-034242B (JP-H01-034242B), U.S. Pat. No. 4,318,791A pamphlet, and EP0284561A1, p-di(dimethylaminobenzoyl)benzene described in JP1990-211452A (JP-H02-211452A), thio-substituted aromatic ketone described in JP1986-194062A (JP-S61-194062A), acylphosphine sulfide described in JP1990-009597B (JP-H02-009597B), acyl phosphine described in JP1990-009596B (JP-H02-009596B), thioxanthones described in JP1988-061950B (JP-S63-061950B), and coumarins described in JP1984-042864B (JP-S59-042864B).

Moreover, polymerization initiators described in JP2008-105379A and JP2009-114290A are also preferable.

Among these photopolymerization initiators, from the viewpoint of the glossiness, (a) the carbonyl compound or (b) the acylphosphine oxide compound is more preferable and specific examples thereof include bis(2,4,6-trimethylbenzoyl)-phenylphosphine oxide (for example, IRGACURE (registered trademark) 819, manufactured by BASF Japan Ltd.), 2-(dimethylamine)-1-(4-morpholinophenyl)-2-benzyl-1-butanone (for example, IRGACURE (registered trademark) 369, manufactured by BASF Japan Ltd.), 2-methyl-1-(4-methylthiophenyl)-2-morpholinopropan-1-one (for example, IRGACURE (registered trademark) 907, manufactured by BASF Japan Ltd.), 1-hydroxy-cyclohexyl-phenyl-ketone (for example, IRGACURE (registered trademark) 184, manufactured by BASF Japan Ltd.), and 2,4,6-trimethylbenzoyl-diphenyl-phosphine oxide (for example, DAROCUR (registered trademark) TPO and LUCIRIN (registered trademark) TPO (both manufactured by BASF Japan Ltd.)).

Among these, from the viewpoints of improving the sensitivity and the compatibility with LED light, as the photopolymerization initiator, (b) the acylphosphine oxide compound is preferable and a monoacylphosphine oxide compound (particularly preferably, 2,4,6-trimethylbenzoyl-diphenyl-phosphine oxide) or a bisacyl phosphine oxide compound (particularly preferably, bis(2,4,6-trimethylbenzoyl)-phenylphosphine oxide) is more preferable.

In a case where the ink composition of the present disclosure contains a photopolymerization initiator, the content of the photopolymerization initiator is preferably in a range of 0.5% by mass to 15.0% by mass, more preferably in a range of 1.0% by mass to 12.0% by mass, and still more preferably in a range of 2.0% by mass to 10.0% by mass based on the total mass of the ink composition.

<Sensitizer>

From the viewpoint of improving the sensitivity, the ink composition of the present disclosure can contain a sensitizer.

Particularly, in a case where LED light is used for curing a film, it is preferable that the ink composition of the present disclosure contains the above-described photopolymerization initiator and a sensitizer.

In a case where the ink composition of the present disclosure contains a sensitizer, only one kind or two or more kinds of sensitizers may be contained.

A sensitizer is a substance that absorbs specific active energy rays and enters an electronically-excited state. A sensitizer having entered in an electronically-excited state is brought into a contact with a photopolymerization initiator and causes actions of electron transfer, energy transfer, heat generation, and the like. In this manner, chemical change in the photopolymerization initiator, that is, decomposition or generation of a radical, an acid, or a base is promoted.

Examples of the sensitizer include a benzophenone (BP), a thioxanthone, isopropylthioxanthone (ITX), ethyl 4-(dimethylamino)benzoate (EDB), anthraquinone, a 3-acyl coumarin derivative, terphenyl, styryl ketone, 3-(aroylmethylene)thiazoline, camphorquinone, eosin, rhodamine, and erythrosine.

Moreover, a compound represented by Formula (i) which is described in JP2010-024276A or a compound represented by Formula (I) which is described in JP1994-107718A (JP-H06-107718A) can be suitably used as a sensitizer.

Among these, from the viewpoint of the glossiness, it is preferable that the sensitizer contains a thioxanthone compound or a benzophenone compound and more preferable that the sensitizer contains a thioxanthone compound.

In a case where these compounds are used, extraction of α-hydrogen from the amino group in the specific resin is promoted, oxygen inhibition can be further suppressed, and the glossiness is further improved.

Among the sensitizers described above, from the viewpoint of the compatibility with LED light and the reactivity with a photopolymerization initiator, at least one selected from the group consisting of thioxanthone, isopropylthioxanthone, and benzophenone is preferable as the sensitizer.

In a case where the ink composition of the present disclosure contains a sensitizer, the content of the sensitizer is preferably in a range of 0.1% by mass to 10% by mass, more preferably in a range of 0.3% by mass to 8.0% by mass, and particularly preferably 0.5% by mass to 6.0% by mass.

<Surfactant>

The ink composition of the present disclosure may contain a surfactant.

As a surfactant, surfactants described in JP1987-173463A (JP-S62-173463A) and JP1987-183457A (JP-S62-183457A) can be exemplified.

Examples thereof include anionic surfactants such as dialkyl sulfosuccinate, alkyl naphthalene sulfonate, and fatty acid salts; nonionic surfactants such as polyoxyethylene alkyl ether, polyoxyethylene alkyl allyl ether, acetylene glycol, a polyoxyethylene.polyoxypropylene block copolymer and siloxanes such as modified polydimethylsiloxane; cationic surfactants such as alkylamine salts and quaternary ammonium salts; and betaine-based surfactants such as carbobetaine and sulfobetaine.

Further, an organic fluoro compound which does not include a polymerizable group may be used instead of a surfactant. It is preferable that the organic fluoro compound is hydrophobic. As the organic fluoro compound, for example, a fluorine-containing surfactant, an oily fluorine-containing compound (for example, fluorine oil), a solid-like fluorine compound resin (for example, a tetrafluoroethylene resin), and compounds described in JP1982-009053B (JP-S57-009053B) (sections 8 to 17) and JP1987-135826B (JP-S62-135826B) are exemplified.

In a case where the ink composition of the present disclosure contains a surfactant, the content of the surfactant is preferably in a range of 0.01% by mass to 5.0% by mass, more preferably in a range of 0.1% by mass to 3.0% by mass, and particularly preferably in a range of 0.3% by mass to 2.0% by mass based on the total mass of the ink composition.

<Polymerization Inhibitor>

The ink composition of the present disclosure may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine)aluminum salts.

Among these, at least one selected from the group consisting of p-methoxyphenol, catechols, quinones, alkylphenols, TEMPO, TEMPOL, cupferron Al, and tris(N-nitroso-N-phenylhydroxyamine)aluminum salts is preferable and at least one selected from the group consisting of p-methoxyphenol, hydroquinone, benzoquinone, BHT, TEMPO, TEMPOL, cupferron Al, and tris(N-nitroso-N-phenylhydroxyamine)aluminum salts is more preferable.

In a case where the ink composition of the present disclosure contains a polymerization inhibitor, the content of the polymerization initiator is preferably in a range of 0.01% by mass to 2.0% by mass, more preferably in a range of 0.02% by mass to 1.0% by mass, and particularly preferably in a range of 0.03% by mass to 0.5% by mass based on the total mass of the ink composition.

<Solvent>

The ink composition of the present disclosure may contain a solvent.

Examples of the solvent include ketone such as acetone, methyl ethyl ketone, or diethyl ketone; alcohol such as methanol, ethanol, 2-propanol, 1-propanol, 1-butanol, or tert-butanol; a chlorinated solvent such as chloroform or methylene chloride; an aromatic solvent such as benzene or toluene; an ester solvent such as ethyl acetate, butyl acetate, or isopropyl acetate; an ether solvent such as diethyl ether, tetrahydrofuran, or dioxane; and a glycol ether solvent such as ethylene glycol monomethyl ether, ethylene glycol dimethyl ether.

In a case where the ink composition of the present disclosure contains a solvent, from the viewpoint of reducing influence on a substrate, the content of the solvent is preferably 5% by mass or less, more preferably in a range of 0.01% by mass to 5% by mass, and particularly preferably in a range of 0.01% by mass to 3% by mass based on the total mass of the ink composition.

<Water>

The ink composition of the present disclosure may contain an infinitesimal amount of water within the range in which the effects of the present disclosure are not impaired.

However, from the viewpoint of more effectively obtaining the effects of the present disclosure, it is preferable that the ink composition of the present disclosure is a non-aqueous ink composition which does not substantially contain water.

Specifically, the content of water is preferably 3% by mass or less, more preferably 2% by mass or less, and particularly preferably 1% by mass or less based on the total mass of the ink composition.

<Colorant>

The ink composition of the present disclosure may contain at least one colorant.

The ink composition containing a colorant can be suitably used as an ink composition.

The colorant is not particularly limited and can be used by being arbitrarily selected from known coloring materials such as pigments, water-soluble dyes, and dispersed dyes. Among these, in terms of excellent weather fastness and being rich in color reproducibility, it is more preferable that the ink composition contains a pigment.

The pigment is not particularly limited and can be appropriately selected according to the purpose thereof. Examples thereof include known organic pigments and inorganic pigments, resin particles dyed with a dye, commercially available pigment dispersions, and surface-treated pigments (for example, pigments being dispersed in water, liquid compounds, or insoluble resins as a dispersion medium and pigments which are surface-treated by a resin or a pigment derivative).

Examples of the organic pigments and inorganic pigments include yellow pigments, red pigments, magenta pigments, blue pigments, cyan pigments, green pigments, orange pigments, purple pigments, brown pigments, black pigments, and white pigments.

In a case where a pigment is used as a colorant, a pigment dispersant may be used as necessary at the time of preparation of pigment particles.

The colorants such as pigments and pigment dispersants can be appropriately referred to known documents, for example, the paragraphs 0152 to 0158 of JP2011-225848A and the paragraphs 0132 to 0149 of JP2009-209352A.

In a case where the ink composition of the present disclosure contains a colorant, the content of the colorant can be set to be in a range of 0.05% by mass to 20% by mass and is preferably in a range of 0.2% by mass to 10% by mass based on the total mass of the ink composition.

<Antioxidant>

From the viewpoints of improving the storage stability and suppressing yellowing of the cured film to be obtained, it is preferable that the ink composition according to the present disclosure contains an antioxidant.

As the antioxidant, a known antioxidant can be used, and examples thereof include a hindered amine compound, a hindered phenol compound, a thioether compound, a phosphoric acid ester compound, and a phosphite compound.

Among these, from the viewpoint of the glossiness, as the antioxidant, a hindered phenol compound having a molecular weight of 1000 or less or a hindered amine compound having a molecular weight of 1000 or less is preferable, and a hindered phenol compound having a molecular weight of 1000 or less is more preferable. With the above-described mode, yellowing of the cured film to be obtained can be suppressed.

Examples of the antioxidant include TINUVIN 123, TINUVIN 144, TINUVIN 292, IRGANOX 1010, IRGANOX 1035, IRGANOX 1076, IRGANOX 1135, IRGANOX 1520L, and IRGANOX 1726 (all manufactured by BASF SE) and SUMILIZER GP (manufactured by Sumitomo Chemical Co., Ltd.).

In a case where the ink composition according to the present disclosure contains an antioxidant, the content of the antioxidant is preferably in a range of 0.01% by mass to 2.0% by mass, more preferably in a range of 0.02% by mass to 1.0% by mass, and particularly preferably in a range of 0.03% by mass to 0.5% by mass with respect to the total mass of the ink composition.

<Other Components>

The ink composition of the present disclosure may contain components other than the components described above.

Examples of the other components include an ultraviolet absorber, a co-sensitizer, an antioxidant, a fading inhibitor, and a conductive salt.

Other components can be appropriately referred to known documents of JP2011-225848A, JP2009-209352A, and the like.

<Preferable Physical Properties>

The viscosity of the ink composition of the present disclosure is not particularly limited.

The viscosity of the ink composition of the present disclosure at 25° C. is preferably in a range of 10 mPa·s to 50 mPa·s, more preferably in a range of 10 mPa·s to 30 mPa·s, and still more preferably in a range of 10 mPa·s to 25 mPa·s. The viscosity of the ink composition can be adjusted by, for example, adjusting the compositional ratios of respective components to be contained.

The viscosity mentioned here is a value measured using a viscometer "VISCOMETER RE-85L" (manufactured by TOKI SANGYO CO., LTD.).

In a case where the viscosity of the ink composition is in the above-described preferable range, the jetting stability can be further improved particularly in the case where the ink composition is used as an ink composition.

The surface tension of the ink composition of the present disclosure is not particularly limited.

The surface tension of the ink composition of the present disclosure at 30° C. is preferably in a range of 20 mN/m to 30 mN/m and more preferably in a range of 23 mN/m to 28 mN/m. In a case where a film is formed on various substrates such as polyolefin, PET, coated paper, and uncoated paper, the surface tension thereof is preferably 30 mN/m or less in terms of wettability and preferably 20 mN/m or greater in terms of suppression of bleeding and permeability.

The surface tension mentioned here is a value measured using a surface tensiometer DY-700 (manufactured by Kyowa Interface Science Co., Ltd.).

[Image Forming Method]

An image forming method according to the present disclosure is an image forming method performed by using the ink composition according to the present disclosure. It is preferable that the image recording method includes an application step of applying the ink composition according to the present disclosure onto a recording medium and an irradiation step of irradiating the ink composition applied onto the recording medium with active energy rays and more preferable that the image recording method includes an application step of applying the ink composition according to the present disclosure onto a recording medium using an ink jet method and an irradiation step of irradiating the ink composition applied onto the recording medium with active energy rays.

According to the image forming method of the present disclosure, a cured film with excellent solvent resistance and glossiness is obtained.

<Application Step>

The application step is a step of applying the ink composition which is the ink composition of the present disclosure onto a recording medium.

As the mode of applying the ink composition onto a recording medium, a mode of applying the ink composition onto a recording medium according to an ink-jet method is particularly preferable.

The recording medium is not particularly limited and, for example, a known substrate can be used as a support or a recording material.

Examples of the substrate include paper, paper on which plastic (for example, polyethylene, polypropylene, or polystyrene) is laminated, a metal plate (for example, a plate of a metal such as aluminum, zinc, or copper), a plastic film (for example, a film of polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin), paper on which the above-described metal is laminated or vapor-deposited, and a plastic film on which the above-described metal is laminated or vapor-deposited Since the ink composition of the present disclosure can form a film having excellent adhesiveness on a substrate, the ink composition is particularly suitable for use to form a film on a non-absorbable substrate.

Preferred examples of the non-absorbable substrate include plastic substrates such as a polyvinyl chloride (PVC) substrate, a polystyrene (PS) substrate, a polycarbonate (PC) substrate, a polyethylene terephthalate (PET) substrate, a polypropylene (PP) substrate, and an acrylic resin substrate.

Application of the ink composition according to the ink-jet method can be performed using a known ink jet recording device.

The ink jet recording device is not particularly limited and a known ink jet recording device which can achieve the target resolution can be arbitrarily selected and used. That is, in a case of known ink jet recording devices including commercially available products, it is possible to perform jetting of an ink composition to a recording medium according to the image forming method.

A known coating method or printing method other than the ink jet method can be employed for the application of the ink composition to the recording medium according to the present disclosure.

The application (coating) of the ink composition according to a coating method can be performed using a coating device such as a bar coater, a roll coater, a slit coater, or a spin coater.

Examples of the ink jet recording device include devices including an ink supply system, a temperature sensor, and heating means.

The ink supply system is formed of an original tank including an ink composition, a supply pipe, an ink supply tank immediately front of an ink-jet head, a filter, and a piezoelectric ink-jet head. The piezoelectric ink-jet head can drive multi-size dots of preferably in a range of 1 pl to 100 pl and more preferably in a range of 8 pl to 30 pl so as to be jetted with the resolution of preferably in a range of 320 dpi×320 dpi (dot per inch) to 4000 dpi×4000 dpi, more preferably in a range of 400 dpi×400 dpi to 1600 dpi×1600 dpi, and still more preferably in a range of 720 dpi×720 dpi to 1600 dpi×1600 dpi. In addition, "dpi" indicates the number of dots per 2.54 cm (1 inch).

<Irradiation Step>

The irradiation step is a step of irradiating the ink composition applied onto a recording medium with active energy rays.

By irradiating the ink composition applied onto a recording medium with active energy rays, it becomes possible that a polymerization reaction of the ink composition proceeds, an image is fixed, and the film hardness of an image is improved.

Examples of the active energy rays which can be used in the irradiation step include ultraviolet rays (UV light), visible light, and electron beams. Among these, UV light is preferable.

The peak wavelength of the active energy rays (light) is preferably in a range of 200 nm to 405 nm, more preferably in a range of 220 nm to 390 nm, and still more preferably in a range of 220 nm to 385 nm.

Further, the peak wavelength thereof is also preferably in a range of 200 nm to 310 nm and also more preferably in a range of 200 nm to 280 nm.

The exposure surface illuminance at the time of irradiation with active energy rays (light) is preferably in a range of 10 mW/cm$^2$ to 2000 mW/cm$^2$ and preferably in a range of 20 mW/cm$^2$ to 1000 mW/cm$^2$.

As sources used to generate active energy rays (light), a mercury lamp, a metal halide lamp, a UV fluorescent lamp, gas laser, and solid-state laser are widely known.

Further, replacement of the light sources exemplified above with a semiconductor UV light emitting device is industrially and environmentally highly useful.

Further, among semiconductor UV light emitting device, a light emitting diode (LED) and a laser diode (LD) are small in size, long in service life, highly efficient, and at low cost, and thus the LED and the LD are expected as light sources for active energy rays.

As the light sources, a metal halide lamp, an extra-high pressure mercury lamp, a high pressure mercury lamp, a medium pressure mercury lamp, a low pressure mercury lamp, an LED, and blue-violet laser are preferable.

Among these, in a case where a sensitizer and a photopolymerization initiator are used in combination, an extra-high pressure mercury lamp which is capable of irradiation with light at a wavelength of 365 nm, 405 nm, or 436 nm, a high pressure mercury lamp which is capable of irradiation with light at a wavelength of 365 nm, 405 nm, or 436 nm, or an LED which is capable of irradiation with light at a wavelength of 355 nm, 365 nm, 385 nm, 395 nm, or 405 nm is more preferable; and an LED which is capable of irradiation with light at a wavelength of 355 nm, 365 nm, 385 nm, 395 nm, or 405 nm is most preferable.

In the irradiation step, the time for irradiating the ink composition applied onto a recording medium with active energy rays is preferably in a range of 0.01 seconds to 120 seconds and more preferably in a range of 0.1 seconds to 90 seconds.

As the irradiation conditions and the basic irradiation methods, similarly, irradiation conditions and irradiation methods disclosed in JP1985-132767A (JP-S60-132767A) can be used.

Specifically, as a method of irradiation with active energy rays, a method in which irradiation with active energy rays is performed by providing light sources on both sides of a head unit including a jetting device of an ink composition and scanning the head unit and light sources using a so-called shuttle system or a method in which irradiation with active energy rays is performed using another light source that is not driven is preferable.

It is preferable that the irradiation with active energy rays is performed after a certain period of time (preferably in a range of 0.01 seconds to 120 seconds and more preferably in a range of 0.01 seconds to 60 seconds) after the ink composition is impacted, heated, and then dried.

(Heating and Drying Step)

The image forming method may further include a heating and drying step after the application step and before the irradiation step as necessary.

Examples of the heating means are not particularly limited and include a heat drum, hot air, an infrared lamp, a heat oven, and heating using a heating plate.

The heating temperature is preferably 40° C. or higher, more preferably in a range of 40° C. to 150° C., and still more preferably in a range of 40° C. to 80° C.

Moreover, the heating time can be appropriately set in consideration of the composition of the ink composition and the printing speed.

The ink composition fixed by heating is optically fixed by being irradiated with active energy rays in the irradiation step as necessary. As described above, in the irradiation step, it is preferable that the ink composition is fixed using UV light.

EXAMPLES

Hereinafter, the present invention will be described in detail with reference to examples, but the present invention is not limited to the examples described below as long as it is within the gist of the present disclosure.

Hereinafter, the numbers at the bottom right of respective structural units of a resin (copolymer) indicate copolymerization ratios (% by mass).

<Synthesis of Specific Resin Used in Example 1A>

130.52 parts of methyl propylene glycol (reaction solvent) was weighed in a three-neck flask provided with a cooling pipe and was heated and stirred at 75° C. in a nitrogen stream.

Apart from this, a mixed solution prepared by mixing 87.01 parts of methyl propylene glycol, 120 parts of 2-(dimethylamino)ethyl methacrylate (1-2) (raw material monomer), 80 parts of methyl methacrylate (B2-2) (raw material monomer), 14.38 parts of V-601 (dimethyl 2,2'-azobis(2-methylpropionate), polymerization initiator manufactured by Wako Pure Chemical Industries, Ltd.), and 11.07 parts of dodecyl mercaptan (chain transfer agent) was added dropwise to the above-described flask for four hours. After dropwise addition, the solution was heated at 75° C. for 2 hours, and the solution was further stirred at 90° C. for 2 hours for the reaction.

The obtained reaction solution was allowed to be naturally cooled, and the cooled reaction solution was poured into 2000 parts of water, re-precipitated, purified, and dried in a vacuum.

In this manner, approximately 200 parts of a resin (1A) (weight-average molecular weight (Mw): 10000) having a structure shown below was obtained.

<Synthesis of Specific Resin Used in Example 18A>

130.3 parts of methyl propylene glycol (reaction solvent) was weighed in a three-neck flask provided with a cooling pipe and was heated and stirred at 75° C. in a nitrogen stream.

Apart from this, a mixed solution prepared by mixing 86.87 parts of methyl propylene glycol, 100 parts of 2-(dimethylamino)ethyl methacrylate (1-2) (raw material monomer), 100 parts of 1,2,2,6,6-pentamethyl-4-piperidyl methacrylate (1-14), 9.72 parts of V-601 (dimethyl 2,2'-azobis (2-methylpropionate), polymerization initiator manufactured by Wako Pure Chemical Industries, Ltd.), and 7.47 parts of dodecyl mercaptan (chain transfer agent) was added dropwise to the above-described flask for four hours. After dropwise addition, the solution was heated at 75° C. for 2 hours, and the solution was further stirred at 90° C. for 2 hours for the reaction.

The obtained reaction solution was allowed to be naturally cooled, and the cooled reaction solution was poured into 2000 parts of water, re-precipitated, purified, and dried in a vacuum.

In this manner, approximately 200 parts of a resin (18A) (weight-average molecular weight (Mw): 10000) having a structure shown below was obtained.

<Synthesis of Specific Resins Used in Examples 2A to 14A>

Each specific resin was synthesized in the same manner as the synthesis of the specific resin used in Example 1A except that the kind and the amount of the monomer serving as a raw material were changed as listed in Table 7.

<Synthesis of Specific Resins Used in Examples 15A to 17A and 19A to 55A, and Comparative Examples 2 and 3>

Each specific resin was synthesized in the same manner as the synthesis of the specific resin used in Example 18A except that the kind and the amount of the monomer serving as a raw material and the kind of the chain transfer agent were changed as listed in Tables 7 to 9.

[Examples 1A to 55A and Comparative Examples 1 to 6]

<Preparation of Ink Composition>

Respective components listed in Tables 7 to 9 were mixed to prepare ink compositions.

Further, the compositions of inks 1 to 6 listed in Tables 7 to 9 are the compositions listed in Tables 1 to 6.

Further, in Examples 32A to 34A, the amounts of the radically polymerizable monomers were changed as listed in Table 8.

Further, in Examples 37A and 38A, 3.0% by mass of the photopolymerization initiator 2 was used without using the photopolymerization initiator 1.

Further, in Examples 41A and 42A, the total amount was set to 100.00% by mass by adding 0.1% by mass of TINUVIN 144 OR TINUVIN 123 serving as an antioxidant and preparing the total amount thereof without changing the addition amount and the use ratio of each monomer.

In Examples 48A to 55A and Comparative Examples 2 and 3, the total amount was set to 100.00% by mass by adding a monomer (2-acryloyloxyethylsuccinic acid (AES) or acrylic acid) containing an acid group whose amount was set to the amount listed in Table 9 with respect to the molar number of the amino group in the specific resin and preparing the total amount thereof without changing the addition amount and the use ratio of each monomer.

In Comparative Example 1, the total amount was set to 100.00% by mass by preparing the total amount thereof without using the specific resin nor changing the addition amount and the use ratio of each monomer.

In Comparative Example 4, 3.00% by mass of dodecyl mercaptan was used without using the specific resin.

In Comparative Example 5, 3.00% by mass of polyallylamine (PAA-15, manufactured by NITTOBO MEDICAL CO., LTD.) was used without using the specific resin.

In Comparative Example 6, 3.00% by mass of polyethyleneimine (EPOMIN SP-200, manufactured by Nippon Shokubai Co., Ltd.) was used without using the specific resin.

TABLE 1

| Composition of ink 1 | | |
|---|---|---|
| Monofunctional monomer | CTFA | 29.00% |
| Monofunctional monomer | IBOA | 23.20% |
| Monofunctional monomer | PEA | 28.00% |
| Bifunctional monomer | 3MPDA | 2.00% |

TABLE 1-continued

Composition of ink 1

| | | |
|---|---|---|
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (% by mass) | | 100.00% |

TABLE 2

Composition of ink 2

| | | |
|---|---|---|
| Monofunctional monomer | THFA | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (% by mass) | | 100.00% |

TABLE 3

Composition of ink 3

| | | |
|---|---|---|
| Monofunctional monomer | ACMO | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (% by mass) | | 100.00% |

TABLE 4

Composition of ink 4

| | | |
|---|---|---|
| Vinyl monomer | VEEA | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (% by mass) | | 100.00% |

TABLE 5

Composition of ink 5

| | | |
|---|---|---|
| Monofunctional monomer | IBOA | 42.20% |
| Monofunctional monomer | PEA | 38.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (% by mass) | | 100.00% |

TABLE 6

Composition of ink 6

| | | |
|---|---|---|
| Monofunctional monomer | CTFA | 35.00% |
| Monofunctional monomer | IBOA | 26.00% |
| Monofunctional monomer | PEA | 17.50% |
| Bifunctional monomer | 3MPDA | 4.00% |
| Vinyl monomer | DVE3 | 1.00% |
| Stabilizer | UV-12 | 0.40% |
| Photopolymerization initiator 1 | | 2.50% |
| Photopolymerization initiator 2 | | 0.50% |
| Sensitizer | | 1.50% |
| Pigment dispersion | Cyan millbase | 8.60% |
| Specific resin | | 3.00% |
| Total (% by mass) | | 100.00% |

The details of the abbreviations listed in Tables 1 to 6 are as follows.

CTFA: cyclic trimethylolpropane formate acrylate (manufactured by Sartomer Co., Inc.)

THFA: tetrahydrofurfuryl acrylate (manufactured by Sartomer Co., Inc.)

ACMO: acryloyl morpholine (manufactured by KJ Chemicals Corporation)

VEEA: 2-(2-hydroxyethoxy)ethyl acrylate (manufactured by Nippon Shokubai Co., Ltd.)

IBOA: isobornyl acrylate (manufactured by Sartomer Co., Inc.)

PEA: 2-phenoxyethyl acrylate (manufactured by Sartomer Co., Inc.)

3MPDA: 3-methyl-1,5-pentanediol diacrylate (manufactured by Sartomer Co., Inc.)

DVE3: triethylene glycol divinyl ether (manufactured by BASF SE)

UV-12: FLORSTAB UV12, nitroso-based polymerization inhibitor, tris(N-nitroso-N-phenylhydroxylamine) aluminum salt (manufactured by Kromachem Ltd.)

<Composition of Cyan Millbase (Cyan Pigment Dispersion)>

Pigment: C. I. Pigment Blue 15:3 (cyan pigment, manufactured by Clariant AG): 20 parts Dispersant: SOLSPERSE 32000 (polymer dispersant, manufactured by Lubrizol Corporation): 5 parts Radically polymerizable monomer: 2-phenoxyethyl acrylate: 75 parts <Evaluation of Each Ink Composition>

The following evaluation was performed using each of the obtained ink compositions.

The results thereof are listed in Tables 7 to 9.

(Adhesiveness of Cured Film)

The adhesiveness was evaluated respectively using a sample (PVC) for evaluation and a sample (PS) for evaluation described below.

The sample (PVC) for evaluation was prepared in the following manner.

First, a polyvinyl chloride (PVC) sheet serving as a substrate was coated with the ink composition obtained in the above-described manner at a thickness of 12 µm using a K hand coater (bar No. 2, manufactured by RK Print Coat Instruments Ltd.), thereby obtaining a coating film. The obtained coating film was irradiated with UV light (ultraviolet rays) using a UV mini-conveyor apparatus CSOT (manufactured by GS Yuasa International Ltd.) for a test which was equipped with an ozoneless metal halide lamp MAN250L and in which the conveyor speed was set to 9.0 m/min and the exposure intensity was set to 2.0 W/cm$^2$, and thus the coating film was cured, thereby obtaining a cured film. In this manner, the sample (PVC) for evaluation was obtained.

The sample (PS) for evaluation was prepared in the same manner as that of the sample (PVC) for evaluation except that the substrate was changed into a polystyrene (PS) sheet.

Here, the following sheets were respectively used as the PVC sheet, the A-PET sheet, the acrylic resin sheet, the PC sheet, and the PS sheet.

PVC sheet: "AVERY (registered trademark) 400 GLOSS WHITE PERMANENT" (manufactured by Avery Dennison Corporation)

PS sheet: "falcon hi impact polystyrene" (manufactured by Robert Horne Group Ltd.)

A cross hatch test was performed on cured films of respective samples for evaluation in conformity with ISO2409 (cross-cut method), and evaluation was performed based on the following evaluation standards.

In the cross hatch test, the cut interval was set to 1 mm and 25 pieces of square lattices having a dimension of 1 mm$^2$ were formed.

In the following evaluation standards, 0 and 1 are acceptable for practical use.

In the following evaluation standards, a percentage (%) of a lattice to be peeled off is a value acquired by the following equation.

The total number of lattices acquired by the following equation is 25.

Percentage (%) of lattice to be peeled off=[(number of lattices being peeled off)/(total number of lattices)]×100

—Evaluation Standards for Adhesiveness of Cured Film—

0: The percentage (%) of a lattice to be peeled off was 0%.

1: The percentage (%) of a lattice to be peeled off was greater than 0% to 5% or less.

2: The percentage (%) of a lattice to be peeled off was greater than 5% to 15% or less.

3: The percentage (%) of a lattice to be peeled off was greater than 15% to 35% or less.

4: The percentage (%) of a lattice to be peeled off was greater than 35% to 65% or less.

5: The percentage (%) of a lattice to be peeled off was greater than 65%.

(Blocking Resistance of Cured Film)

The evaluation of blocking resistance of the cured film was performed using the above-described sample (PVC) for evaluation.

The sample (PVC) for evaluation was cut into a size of 20 mm×20 mm and this was used as an evaluation sample. Two evaluation samples were prepared.

Further, each sample was prepared by forming a cured film under two different exposure conditions.

Metal halide lamp: The exposure intensity was set to 2.0 W/cm$^2$ using an ozoneless metal halide lamp MAN250L.

LED: The exposure was performed under an exposure energy condition of 300 mJ/cm$^2$ using a 385 nm UV-LED irradiator (manufactured by CCS Inc.) for experiment as an exposure device.

Next, two evaluation samples were overlapped each other such that the cured films were brought into contact with each other, and a load of 10 N was applied to a direction in which two evaluation samples were pressed against each other for 10 seconds, and then the evaluation samples were peeled off.

Subsequently, each of the cured films of the two evaluation samples was observed, the presence or absence of traces in which the cured films were adhered to each other and the degree of adhesion in traces was visually observed, and then the blocking resistance of the cured films was evaluated based on the following evaluation standards.

—Evaluation Standards for Blocking Resistance of Cured Film—

5: Traces in which cured films were adhered to each other were not found and the blocking resistance of a cured film was markedly excellent.

4: Traces in which cured films were adhered to each other were found in a range of greater than 0% to less than 3% of the entire area of a cured film, but the blocking resistance of the cured film was not problematic for practical use.

3: Traces in which cured films were adhered to each other were found in a range of 3% to less than 10% of the entire area of a cured film, but the blocking resistance of the cured film was within the acceptable range for practical use.

2: Traces in which cured films were adhered to each other were found in a range of 10% to less than 50% of the entire area of a cured film, and the blocking resistance of the cured film was out of the acceptable range for practical use.

1: Traces in which cured films were adhered to each other were found in 50% or greater of the entire area of a cured film, and the blocking resistance of the cured film was extremely poor.

(Scratch Resistance of Cured Film)

The scratch resistance of an image obtained from the ink composition was evaluated by performing the following scratch test on each cured film obtained by curing the coated film of the ink composition. The details are described below.

The evaluation of the scratch resistance of the cured film was performed using the above-described sample (PVC) for evaluation.

The scratch test was performed on the cured film of the sample (PVC) for evaluation under the following conditions, the manner of how the cured film was scratched was visually observed after the test was performed, and the scratch resistance of the cured film was evaluated based on the following evaluation standards.

—Conditions for Scratch Test—

Test standard . . . ISO1518 (JIS K 5600)

Device . . . reciprocating abrasion tester "Model 5900" (manufactured by Taber)

Scratch jig . . . 0.50 mm Scratch Tip for TABER scratch test

Weight . . . 2 N

Scratch speed . . . 35 mm/s

Number of scratches . . . 5 reciprocations

The scratch test was performed, the manner of how the cured film was scratched was visually observed after the test was performed, and the scratch resistance of the cured film was evaluated based on the following evaluation standards.

—Evaluation Standards for Scratch Resistance of Cured Film—

A: There was no trace on the cured film, and the scratch resistance of the cured film was extremely excellent.

B: Traces remained on the cured film in a level where the cured film was not scraped, and the scratch resistance of the cured film was in a practically acceptable level.

C: The surface of the cured film was scraped, and the scratch resistance of the cured film was not in a practically acceptable level.

D: The surface of the cured film was scraped so that the surface of the substrate was exposed, and the scratch resistance of the cured film was extremely degraded.

(Solvent Resistance of Cured Film)

The solvent resistance of an image obtained from the ink composition was evaluated by performing the following solvent test on the cured film obtained by curing the coated film of the ink composition. Hereinafter, the details are described.

The solvent resistance of the cured film was evaluated using the above-described sample (PVC) for evaluation.

A test for the solvent resistance was performed on the cured film of the sample (PVC) for evaluation under the following conditions, the color density with respect to the cured film was visually observed after the test was performed, and the scratch resistance of the cured film was evaluated based on the following evaluation standards.

The surface of an exposed printing object was rubbed with a cotton swab impregnated with isopropyl alcohol, and the evaluation was visually performed based on the following standards.

—Evaluation Standards for Solvent Resistance of Cured Film—

5: A change was not found in the image even in a case where the surface of the image was rubbed 15 times or more.

4: The density of the image was lowered because of rubbing the image 10 to 14 times.

3: The density of the image was lowered because of rubbing the image 5 to 9 times.

2: The density of the image was significantly lowered because of rubbing the image only 2 to 4 times.

1: The density of the image was significantly lowered because of rubbing the image only once.

(Storage Stability of Ink Composition)

The ink composition (50 mL) was put into a 50 mL glass bottle, and the bottle was covered and allowed to stand for 4 hours under a condition of a thermostatic bath (60° C.). The storage stability of the ink composition was evaluated based on the following evaluation standards by measuring the viscosity of the ink composition before and after the composition was allowed to stand and acquiring an increase rate of the viscosity after the composition was allowed to stand with respect to the viscosity before the composition was allowed to stand. In the following evaluation standards, 5 or 4 is acceptable for practical use.

Moreover, the viscosity of the ink composition was measured using a VISCOMETER RE-85L (manufactured by TOKI SANGYO CO., LTD.) as a viscometer under a liquid temperature condition of 25° C.

The results are listed in Table 1.

—Evaluation Standards for Storage Stability of Ink Composition—

5: The increase rate of the viscosity after the composition was allowed to stand with respect to the viscosity before the composition was allowed to stand is less than 10%.

4: The increase rate of the viscosity after the composition was allowed to stand with respect to the viscosity before the composition was allowed to stand is 10% to less than 20%.

3: The increase rate of the viscosity after the composition was allowed to stand with respect to the viscosity before the composition was allowed to stand is 20% to less than 30%.

2: The increase rate of the viscosity after the composition was allowed to stand with respect to the viscosity before the composition was allowed to stand is 30% to less than 40%.

1: The increase rate of the viscosity after the composition was allowed to stand with respect to the viscosity before the composition was allowed to stand is 40% or greater.

(Jetting Stability)

The jetting stability of the ink composition (ink) was evaluated using a commercially available ink jet recording device (LuxelJet (registered trademark) UV3600GT/XT: trade name, manufactured by Fujifilm Holdings Corporation) including a piezoelectric ink jetting head, a polyethylene terephthalate (PET) film (manufactured by Toray Industries, Inc.) as a recording medium (substrate), and the ink composition as an ink according to the following method.

A process of forming a 100% solid image by jetting the ink composition (ink) onto the PET film under the following jetting conditions using the ink jet recording device and irradiating impacted ink with UV light (irradiation dose: 1000 mW/cm$^2$) was continuously performed for 60 minutes.

The number of nozzles with ink clogging (nozzle loss) being generated in a case where the process was continuously performed for 60 minutes and the ink composition was jetted was acquired, and evaluation was performed based on the following evaluation standards. In the following evaluation standards, 5 or 4 are acceptable for practical use.

—Jetting Conditions—

Number of channels: 318/head
Drive frequency: 4.8 kHz/dot
Ink drops: 7 drops, 42 pl
Temperature of head nozzle: 45° C.

—Evaluation Standards for Jetting Stability of Ink Composition—

5: The nozzle loss is 0 to less than 2.
4: The nozzle loss is 2 to less than 5.
3: The nozzle loss is 5 to less than 7.
2: The nozzle loss is 7 to less than 10.
1: The nozzle loss is 10 or greater.

(Glossiness)

The glossiness of a 100% solid image obtained by performing the same operation as in the evaluation for the jetting stability of the ink composition was measured at a measurement angle of 60° C. using a gloss meter "GM-268Plus" (manufactured by Konica Minolta, Inc.). The glossiness of the cured film was evaluated based on the measurement results and the following standards. In the description below, GU is an abbreviation that stands for Gross Unit.

—Evaluation Standards for Glossiness—

5: The glossiness was 25 GU (Gross Unit) or greater.
4: The glossiness was 20 GU or greater and less than 25 GU.
3: The glossiness was 15 GU or greater and less than 20 GU.
2: The glossiness was 10 GU or greater and less than 15 GU.
1: The glossiness was less than 10 GU.

(Yellowing of Image)

The yellowing of an image was evaluated using a 100% solid image obtained by performing the same operation as in the evaluation for the jetting stability of the ink composition.

Specifically, the color (L*a*b*) of the image was measured immediately after the image was formed (within 30 minutes from the image formation) and after 3 days from the image formation using a spectrophotometer SpectroEye (manufactured by X-Rite Inc.), and a color difference ($\Delta E$) between these colors was acquired.

The yellowing of the image was evaluated based on the color difference $\Delta E$ and the evaluation standards.

—Evaluation Standards of Yellowing of Image—

5: $\Delta E$ was 0 or greater and less than 0.4, and yellowing of the image was not practically problematic.

4: $\Delta E$ was 0.4 or greater and less than 1.6, and yellowing of the image was not practically problematic.

3: $\Delta E$ was 1.6 or greater and less than 3.2, and yellowing of the image was not practically problematic.

2: $\Delta E$ was 3.2 or greater and less than 4.8, and yellowing of the image was not practically acceptable.

1: $\Delta E$ was 4.8 or greater, and yellowing of the image was not practically acceptable.

TABLE 7

| | Specific resin | | | | | | | | | | | |
|---|---|---|---|---|---|---|---|---|---|---|---|---|
| | Constitutional unit | | | | Mass ratio | | | Amine value (mmol/g) | Mw | Content with respect to total amount of composition (% by mass) | Photopolymerization initiator 1 | Photopolymerization initiator 2 | Sensitizer |
| | Constitutional unit A1 | Constitutional unit A2 | Constitutional unit B | Terminal structure | Constitutional unit A1 | Constitutional unit A2 | Constitutional unit B | | | | | | |
| Example 1A | (1-2) | — | (B2-2) | (4-4) | 60 | 0 | 40 | 3.82 | 10,000 | 3.0 | Irgacure 819 | Irgacure 184 | ITX |
| Example 2A | (1-4) | — | (B2-2) | (4-4) | 70 | 0 | 30 | 3.78 | 10,000 | 3.0 | Irgacure 819 | Irgacure 184 | ITX |
| Example 3A | (1-6) | — | (B2-2) | (4-4) | 80 | 0 | 20 | 3.75 | 10,000 | 3.0 | Irgacure 819 | Irgacure 184 | ITX |
| Example 4A | (1-9) | — | (B2-2) | (4-4) | 55 | 0 | 45 | 3.87 | 10,000 | 3.0 | Irgacure 819 | Irgacure 184 | ITX |
| Example 5A | (1-11) | — | (B2-2) | (4-4) | 75 | 0 | 25 | 3.80 | 10,000 | 3.0 | Irgacure 819 | Irgacure 184 | ITX |
| Example 6A | (1-2) | — | (B2-2) | (4-4) | 70 | 0 | 30 | 4.45 | 10,000 | 3.0 | Irgacure 819 | Irgacure 184 | ITX |
| Example 7A | (1-4) | — | (B2-2) | (4-4) | 80 | 0 | 20 | 4.32 | 10,000 | 3.0 | Irgacure 819 | Irgacure 184 | ITX |
| Example 8A | (1-6) | — | (B2-2) | (4-4) | 90 | 0 | 10 | 4.22 | 10,000 | 3.0 | Irgacure 819 | Irgacure 184 | ITX |
| Example 9A | (1-9) | — | (B2-2) | (4-4) | 60 | 0 | 40 | 4.22 | 10,000 | 3.0 | Irgacure 819 | Irgacure 184 | ITX |
| Example 10A | (1-11) | — | (B2-2) | (4-4) | 85 | 0 | 15 | 4.31 | 10,000 | 3.0 | Irgacure 819 | Irgacure 184 | ITX |
| Example 11A | (1-2) | — | (B2-8) | (4-4) | 70 | 0 | 30 | 4.45 | 10,000 | 3.0 | Irgacure 819 | Irgacure 184 | ITX |
| Example 12A | (1-2) | — | (B4-9) | (4-4) | 70 | 0 | 30 | 4.45 | 10,000 | 3.0 | Irgacure 819 | Irgacure 184 | ITX |
| Example 13A | (1-2) | — | (B5-2) | (4-4) | 70 | 0 | 30 | 4.45 | 10,000 | 3.0 | Irgacure 819 | Irgacure 184 | ITX |
| Example 14A | (1-2) | — | (B6-5) | (4-4) | 70 | 0 | 30 | 4.45 | 10,000 | 3.0 | Irgacure 819 | Irgacure 184 | ITX |
| Example 15A | (1-14) | — | — | (4-4) | 100 | 0 | 0 | 4.18 | 10,000 | 3.0 | Irgacure 819 | Irgacure 184 | ITX |
| Example 16A | (1-2) | (1-11) | — | (4-4) | 50 | 50 | 0 | 5.71 | 10,000 | 3.0 | Irgacure 819 | Irgacure 184 | ITX |
| Example 17A | (1-2) | (1-14) | — | (4-4) | 80 | 20 | 0 | 5.92 | 10,000 | 3.0 | Irgacure 819 | Irgacure 184 | ITX |
| Example 18A | (1-2) | (1-14) | — | (4-4) | 50 | 50 | 0 | 5.27 | 10,000 | 3.0 | Irgacure 819 | Irgacure 184 | ITX |
| Example 19A | (1-2) | (1-14) | — | (4-4) | 20 | 80 | 0 | 4.61 | 10,000 | 3.0 | Irgacure 819 | Irgacure 184 | ITX |
| Example 20A | (1-2) | — | — | (4-4) | 100 | 0 | 0 | 6.36 | 10,000 | 3.0 | Irgacure 819 | Irgacure 184 | ITX |

TABLE 7-continued

| | Antioxidant | Radically polymerizable monomer containing acid group | Amount of radically polymerizable monomer containing acid group per 100 g of composition (mmol) | Ink composition | Light source (metal halide lamp) | | | | | | | | | | Light source (LED) | | |
|---|---|---|---|---|---|---|---|---|---|---|---|---|---|---|---|---|---|
| | | | | | Blocking resistance | Scratch resistance | Solvent resistance | Adhesiveness PVC | Adhesiveness Styrene | Storage Stability | Jetting stability | Glossiness | Yellowing | Blocking resistance | Scratch resistance | Solvent resistance |
| Example 1A | — | — | 0.000 | Ink 1 | 4 | 4 | 4 | 1 | 1 | 5 | 5 | 4 | 4 | 3 | 3 | 3 |
| Example 2A | — | — | 0.000 | Ink 1 | 4 | 4 | 4 | 1 | 1 | 5 | 5 | 4 | 4 | 3 | 3 | 3 |
| Example 3A | — | — | 0.000 | Ink 1 | 4 | 4 | 4 | 1 | 1 | 5 | 5 | 4 | 4 | 3 | 3 | 3 |
| Example 4A | — | — | 0.000 | Ink 1 | 4 | 4 | 4 | 1 | 1 | 5 | 5 | 4 | 4 | 3 | 3 | 3 |
| Example 5A | — | — | 0.000 | Ink 1 | 4 | 4 | 4 | 1 | 1 | 5 | 5 | 4 | 4 | 3 | 3 | 3 |
| Example 6A | — | — | 0.000 | Ink 1 | 4 | 4 | 5 | 1 | 1 | 5 | 5 | 4 | 4 | 3 | 3 | 4 |
| Example 7A | — | — | 0.000 | Ink 1 | 4 | 4 | 5 | 1 | 1 | 5 | 5 | 4 | 4 | 3 | 3 | 4 |
| Example 8A | — | — | 0.000 | Ink 1 | 4 | 4 | 5 | 1 | 1 | 5 | 5 | 4 | 4 | 3 | 3 | 4 |
| Example 9A | — | — | 0.000 | Ink 1 | 4 | 4 | 5 | 1 | 1 | 5 | 5 | 4 | 4 | 3 | 3 | 4 |
| Example 10A | — | — | 0.000 | Ink 1 | 4 | 4 | 5 | 1 | 1 | 5 | 5 | 4 | 4 | 3 | 3 | 4 |
| Example 11A | — | — | 0.000 | Ink 1 | 4 | 4 | 5 | 1 | 1 | 5 | 5 | 4 | 4 | 3 | 3 | 4 |
| Example 12A | — | — | 0.000 | Ink 1 | 4 | 4 | 5 | 0 | 0 | 5 | 5 | 4 | 4 | 3 | 3 | 4 |
| Example 13A | — | — | 0.000 | Ink 1 | 4 | 4 | 5 | 0 | 0 | 5 | 5 | 4 | 4 | 3 | 3 | 4 |
| Example 14A | — | — | 0.000 | Ink 1 | 4 | 4 | 5 | 0 | 0 | 5 | 5 | 4 | 4 | 3 | 3 | 4 |
| Example 15A | — | — | 0.000 | Ink 1 | 5 | 5 | 5 | 0 | 0 | 5 | 5 | 4 | 4 | 4 | 4 | 4 |
| Example 16A | — | — | 0.000 | Ink 1 | 5 | 5 | 5 | 1 | 1 | 5 | 5 | 5 | 4 | 4 | 4 | 4 |
| Example 17A | — | — | 0.000 | Ink 1 | 5 | 5 | 5 | 0 | 0 | 5 | 5 | 5 | 4 | 5 | 5 | 5 |
| Example 18A | — | — | 0.000 | Ink 1 | 5 | 5 | 5 | 0 | 0 | 5 | 5 | 5 | 4 | 5 | 5 | 5 |
| Example 19A | — | — | 0.000 | Ink 1 | 5 | 5 | 5 | 0 | 0 | 5 | 5 | 5 | 4 | 5 | 5 | 5 |
| Example 20A | — | — | 0.000 | Ink 1 | 5 | 4 | 5 | 1 | 1 | 5 | 5 | 5 | 4 | 4 | 3 | 4 |

TABLE 8

| | Specific resin | | | | | | | | | | | |
|---|---|---|---|---|---|---|---|---|---|---|---|---|
| | Constitutional unit | | | Mass ratio | | | Amine value (mmol/g) | Mw | Content with respect to total amount of composition (% by mass) | Photopolymerization initiator 1 | Photopolymerization initiator 2 | Sensitizer |
| | Constitutional unit A1 | Constitutional unit A2 | Constitutional unit B | Terminal structure | Constitutional unit A1 | Constitutional unit A2 | Constitutional unit B | | | | | | |
| Example 21A | (1-4) | — | — | (4-4) | 100 | 0 | 0 | 5.40 | 10,000 | 3.0 | Irgacure 819 | Irgacure 184 | ITX |
| Example 22A | (1-6) | — | — | (4-4) | 100 | 0 | 0 | 4.69 | 10,000 | 3.0 | Irgacure 819 | Irgacure 184 | ITX |
| Example 23A | (1-9) | — | — | (4-4) | 100 | 0 | 0 | 7.03 | 10,000 | 3.0 | Irgacure 819 | Irgacure 184 | ITX |
| Example 24A | (1-11) | — | — | (4-4) | 100 | 0 | 0 | 5.07 | 10,000 | 3.0 | Irgacure 819 | Irgacure 184 | ITX |
| Example 25A | (1-2) | (1-14) | — | (4-1) | 50 | 50 | 0 | 5.27 | 10,000 | 3.0 | Irgacure 819 | IrgaGUre 184 | ITX |
| Example 26A | (1-2) | (1-14) | — | (4-6) | 50 | 50 | 0 | 5.27 | 10,000 | 3.0 | Irgacure 819 | Irgacure 184 | ITX |
| Example 27A | (1-2) | (1-14) | — | (4-7) | 50 | 50 | 0 | 5.27 | 10,000 | 3.0 | Irgacure 819 | Irgacure 184 | ITX |
| Example 28A | (1-2) | (1-14) | — | (4-14) | 50 | 50 | 0 | 5.27 | 10,000 | 3.0 | Irgacure 819 | Irgacure 184 | ITX |
| Example 29A | (1-2) | (1-14) | — | (4-4) | 50 | 50 | 0 | 5.27 | 4,000 | 3.0 | Irgacure 819 | Irgacure 184 | ITX |
| Example 30A | (1-2) | (1-14) | — | (4-4) | 50 | 50 | 0 | 5.27 | 20,000 | 3.0 | Irgacure 819 | Irgacure 184 | ITX |
| Example 31A | (1-2) | (1-14) | — | (4-4) | 50 | 50 | 0 | 5.27 | 50,000 | 3.0 | Irgacure 819 | Irgacure 184 | ITX |
| Example 32A | (1-2) | (1-14) | — | (4-4) | 50 | 50 | 0 | 5.27 | 10,000 | 0.5 | Irgacure 819 | Irgacure 184 | ITX |
| Example 33A | (1-2) | (1-14) | — | (4-4) | 50 | 50 | 0 | 5.27 | 10,000 | 6.0 | Irgacure 819 | Irgacure 184 | ITX |
| Example 34A | (1-2) | (1-14) | — | (4-4) | 50 | 50 | 0 | 5.27 | 10,000 | 10.0 | Irgacure 819 | Irgacure 184 | ITX |
| Example 35A | (1-2) | (1-14) | — | (4-4) | 50 | 50 | 0 | 5.27 | 10,000 | 3.0 | Irgacure 819 | Irgacure 270 | ITX |
| Example 36A | (1-2) | (1-14) | — | (4-4) | 50 | 50 | 0 | 5.27 | 10,000 | 3.0 | Irgacure 819 | Irgacure 270 | ITX |
| Example 37A | (1-2) | (1-14) | — | (4-4) | 50 | 50 | 0 | 5.27 | 10,000 | 3.0 | — | Irgacure 184 | ITX |
| Example 38A | (1-2) | (1-14) | — | (4-4) | 50 | 50 | 0 | 5.27 | 10,000 | 3.0 | — | Irgacure 184 | ITX |
| Example 39A | (1-2) | (1-14) | — | (4-4) | 50 | 50 | 0 | 5.27 | 10,000 | 3.0 | Irgacure 819 | Irgacure 184 | — |
| Example 40A | (1-2) | (1-14) | — | (4-4) | 50 | 50 | 0 | 5.27 | 10,000 | 3.0 | Irgacure 819 | Irgacure 184 | BP |

TABLE 8-continued

| | Radically polymerizable monomer containing acid group | Amount of radically polymerizable monomer containing acid group per 100 g of Ink composition (mmol) | Light source (metal halide lamp) | | | | | | | | | Light source (LED) | | |
|---|---|---|---|---|---|---|---|---|---|---|---|---|---|---|---|
| Antioxidant | | | Blocking resistance | Scratch resistance | Solvent resistance | Adhesiveness PVC | Adhesiveness Styrene | Storage Stability | Jetting stability | Glossiness | Yellowing | Blocking resistance | Scratch resistance | Solvent resistance |
| Example 21A | — | — | 0.000 | 5 | 4 | 5 | 1 | 1 | 5 | 5 | 5 | 4 | 4 | 3 | 4 |
| Example 22A | — | — | 0.000 | 5 | 4 | 5 | 1 | 1 | 5 | 5 | 5 | 4 | 4 | 3 | 4 |
| Example 23A | — | — | 0.000 | 5 | 4 | 5 | 1 | 1 | 5 | 5 | 5 | 4 | 4 | 3 | 4 |
| Example 24A | — | — | 0.000 | 5 | 4 | 5 | 5 | 5 | 5 | 5 | 4 | 4 | 4 | 3 | 5 |
| Example 25A | — | — | 0.000 | 5 | 5 | 5 | 0 | 0 | 5 | 5 | 5 | 4 | 5 | 5 | 5 |
| Example 26A | — | — | 0.000 | 5 | 5 | 5 | 0 | 0 | 5 | 5 | 5 | 4 | 5 | 5 | 5 |
| Example 27A | — | — | 0.000 | 5 | 5 | 5 | 0 | 0 | 5 | 5 | 4 | 4 | 5 | 5 | 5 |
| Example 28A | — | — | 0.000 | 5 | 4 | 5 | 0 | 0 | 5 | 5 | 4 | 4 | 5 | 4 | 5 |
| Example 29A | — | — | 0.000 | 5 | 5 | 5 | 0 | 0 | 5 | 5 | 5 | 4 | 5 | 5 | 5 |
| Example 30A | — | — | 0.000 | 5 | 5 | 5 | 0 | 0 | 5 | 5 | 5 | 4 | 5 | 5 | 5 |
| Example 31A | — | — | 0.000 | 4 | 4 | 4 | 0 | 0 | 5 | 4 | 5 | 4 | 5 | 4 | 5 |
| Example 32A | — | — | 0.000 | 4 | 4 | 4 | 0 | 0 | 5 | 5 | 5 | 4 | 5 | 5 | 5 |
| Example 33A | — | — | 0.000 | 4 | 4 | 4 | 0 | 0 | 4 | 4 | 4 | 4 | 3 | 3 | 3 |
| Example 34A | — | — | 0.000 | 4 | 4 | 4 | 0 | 0 | 5 | 4 | 4 | 4 | 3 | 3 | 3 |
| Example 35A | — | — | 0.000 | 4 | 4 | 4 | 0 | 0 | 5 | 5 | 4 | 4 | 3 | 3 | 3 |
| Example 36A | — | — | 0.000 | 4 | 4 | 4 | 0 | 0 | 5 | 5 | 4 | 4 | 3 | 3 | 3 |
| Example 37A | — | — | 0.000 | 4 | 4 | 4 | 1 | 1 | 5 | 5 | 4 | 4 | 3 | 3 | 3 |
| Example 38A | — | — | 0.000 | 5 | 5 | 5 | 0 | 0 | 5 | 5 | 5 | 4 | 5 | 5 | 5 |

TABLE 9

| | Specific resin | | | | | | | | | | | |
|---|---|---|---|---|---|---|---|---|---|---|---|---|
| | Constitutional unit | | | Mass ratio | | | Amine | | | Content with respect to total amount of composition (% by mass) | Photopolymerization initiator 1 | Photopolymerization initiator 2 | Sensitizer |
| | Constitutional unit A1 | Constitutional unit A2 | Constitutional unit B | Terminal structure | Constitutional unit A1 | Constitutional unit A2 | Constitutional unit B | value (mmol/g) | Mw | | | | |
| Example 41A | (1-2) | (1-14) | | (4-4) | 50 | 50 | 0 | 527 | 10,000 | 3.0 | Irgacure 819 | Irgacure 184 | ITX |
| Example 42A | (1-2) | (1-14) | | (4-4) | 50 | 50 | 0 | 5.27 | 10,000 | 3.0 | Irgacure 819 | Irgacure 184 | ITX |
| Example 43A | (1-2) | (1-14) | | (4-4) | 50 | 50 | 0 | 5.27 | 10,000 | 3.0 | Irgacure 819 | Irgacure 184 | ITX |
| Example 44A | (1-2) | (1-14) | | (4-4) | 50 | 50 | 0 | 5.27 | 10,000 | 3.0 | Irgacure 819 | Irgacure 184 | ITX |
| Example 45A | (1-2) | (1-14) | | (4-4) | 50 | 50 | 0 | 5.27 | 10,000 | 3.0 | Irgacure 819 | Irgacure 184 | ITX |
| Example 46A | (1-2) | (1-14) | | (4-4) | 50 | 50 | 0 | 5.27 | 10,000 | 3.0 | Irgacure 819 | Irgacure 184 | ITX |
| Example 47A | (1-2) | (1-14) | | (4-4) | 50 | 50 | 0 | 5.27 | 10,000 | 3.0 | Irgacure 819 | Irgacure 184 | ITX |
| Example 48A | (1-2) | (1-14) | | (4-4) | 50 | 50 | 0 | 5.27 | 10,000 | 3.0 | Irgacure 819 | Irgacure 184 | ITX |
| Example 49A | (1-2) | (1-14) | | (4-4) | 50 | 50 | 0 | 5.27 | 10,000 | 3.0 | Irgacure 819 | Irgacure 184 | ITX |
| Example 50A | (1-2) | (1-14) | | (4-4) | 50 | 50 | 0 | 5.27 | 10,000 | 3.0 | Irgacure 819 | Irgacure 184 | ITX |
| Example 51A | (1-2) | (1-14) | | (4-4) | 50 | 50 | 0 | 5.27 | 10,000 | 3.0 | Irgacure 819 | Irgacure 184 | ITX |
| Example 52A | (1-2) | (1-14) | | (4-4) | 50 | 50 | 0 | 5.27 | 10,000 | 3.0 | Irgacure 819 | Irgacure 184 | ITX |
| Example 53A | (1-2) | (1-14) | | (4-4) | 50 | 50 | 0 | 5.27 | 10,000 | 3.0 | Irgacure 819 | Irgacure 184 | ITX |

TABLE 9-continued

| | | | | | | | |
|---|---|---|---|---|---|---|---|
| Example 54A | (1-2) | (4-4) | 50 | 5.27 | 10,000 | 3.0 | Irgacure 819 | Irgacure 184 | ITX |
| Example 55A | (1-2) | (4-4) | 50 | 5.27 | 10,000 | 3.0 | Irgacure 819 | Irgacure 184 | ITX |
| Comparative Example 1 | — | — | — | — | — | — | Irgacure 819 | Irgacure 184 | ITX |
| Comparative Example 2 | (1-2) | (4-4) | 50 | 5.27 | 10,000 | 3.0 | Irgacure 819 | Irgacure 184 | ITX |
| Comparative Example 3 | (1-2) | (4-4) | 50 | 5.27 | 10,000 | 3.0 | Irgacure 819 | Irgacure 184 | ITX |
| Comparative Example 4 | (1-2) | — | 0 | 0.00 | 10,000 | 3.0 | Irgacure 819 | Irgacure 184 | ITX |
| Comparative Example 5 | Polyallylamine PAA-15, manufactured by NITTOBO MEDICAL CO., LTD. | | | 17.51 | 15,000 | 3.0 | Irgacure 819 | Irgacure 184 | ITX |
| Comparative Example 6 | Polyethyleneimine EPOMIN SP-200, manufactured by Nippon Shokubai Co., Ltd. | | | 18.00 | 10,000 | 3.0 | Irgacure 819 | Irgacure 184 | ITX |

| | | Radically polymerizable monomer containing acid group | Amount of radically polymerizable monomer containing acid group per 100 g of composition (mmol) | Ink composition | Light source (metal halide lamp) | | | | | | | | Light source (LED) | | |
|---|---|---|---|---|---|---|---|---|---|---|---|---|---|---|---|
| | Antioxidant | | | | Blocking resistance | Scratch resistance | Solvent resistance | Adhesiveness PVC | Styrene | Storage Stability | Jetting stability | Glossiness | Yellowing | Blocking resistance | Scratch resistance | Solvent resistance |
| Example 41A | TINUVIN 144 | — | 0.000 | Ink 1 | 5 | 5 | 5 | 0 | 0 | 5 | 5 | 5 | 5 | 5 | 5 | 5 |
| Example 42A | TINUVIN 123 | — | 0.000 | Ink 1 | 5 | 5 | 5 | 0 | 0 | 5 | 5 | 5 | 5 | 5 | 5 | 5 |
| Example 43A | — | — | 0.000 | Ink 1 | 5 | 5 | 5 | 0 | 0 | 5 | 5 | 5 | 4 | 5 | 5 | 5 |
| Example 44A | — | — | 0.000 | Ink 1 | 5 | 5 | 5 | 0 | 0 | 5 | 5 | 5 | 4 | 5 | 5 | 5 |
| Example 45A | — | — | 0.000 | Ink 1 | 5 | 5 | 5 | 0 | 0 | 5 | 5 | 5 | 4 | 5 | 5 | 5 |
| Example 46A | — | — | 0.000 | Ink 1 | 4 | 4 | 4 | 1 | 1 | 5 | 5 | 5 | 4 | 3 | 3 | 3 |

TABLE 9-continued

| | | | | | | | | | | | | | | |
|---|---|---|---|---|---|---|---|---|---|---|---|---|---|---|
| Example 47A | — | — | 0.000 | Ink 1 | 5 | 5 | 5 | 5 | 5 | 0 | 0 | 5 | 5 | 5 |
| Example 48A | — | 2-Acryloyloxyethyl succinic acid | 1.265 | Ink 1 | 4 | 4 | 4 | 5 | 4 | 1 | 1 | 4 | 3 | 3 |
| Example 49A | — | 2-Acryloyloxyethyl succinic acid | 0.158 | Ink 1 | 4 | 5 | 5 | 5 | 5 | 0 | 0 | 5 | 3 | 4 |
| Example 50A | — | 2-Acryloyloxyethyl succinic acid | 0.079 | Ink 1 | 5 | 5 | 5 | 5 | 5 | 0 | 0 | 5 | 5 | 5 |
| Example 51A | — | 2-Acryloyloxyethyl succinic acid | 0.016 | Ink 1 | 5 | 5 | 5 | 5 | 5 | 0 | 0 | 5 | 5 | 5 |
| Example 52A | — | Acrylic acid | 1.265 | Ink 1 | 4 | 4 | 4 | 5 | 4 | 1 | 1 | 4 | 3 | 3 |
| Example 53A | — | Acrylic acid | 0.158 | Ink 1 | 5 | 5 | 5 | 5 | 5 | 0 | 0 | 5 | 5 | 4 |
| Example 54A | — | Acrylic acid | 0.079 | Ink 1 | 5 | 5 | 5 | 5 | 5 | 0 | 0 | 5 | 5 | 5 |
| Example 55A | — | Acrylic acid | 0.016 | Ink 1 | 5 | 5 | 5 | 5 | 5 | 0 | 0 | 5 | 5 | 5 |
| Comparative Example 1 | — | — | 0.000 | Ink 1 | 1 | 1 | 1 | 1 | 1 | 5 | 5 | 1 | 1 | 1 |
| Comparative Example 2 | — | 2-Acryloyloxyethyl succinic acid | 2.371 | Ink 1 | 2 | 2 | 2 | 2 | 2 | 4 | 5 | 3 | 1 | 1 |
| Comparative Example 3 | — | Acrylic acid | 2.371 | Ink 1 | 2 | 2 | 2 | 2 | 2 | 4 | 5 | 3 | 1 | 1 |
| Comparative Example 4 | — | — | 0.000 | Ink 1 | 3 | 3 | 3 | 3 | 3 | 3 | 3 | 2 | 2 | 2 |
| Comparative Example 5 | — | — | 0.000 | Ink 1 | 3 | 3 | 3 | 3 | 3 | 3 | 3 | 2 | 2 | 2 |
| Comparative Example 6 | — | — | 0.000 | Ink 1 | 1 | 1 | 1 | 1 | 1 | 5 | 5 | 1 | 1 | 1 |

The details of the abbreviations listed in Tables 7 to 9 are shown below.

The constitutional units (1-2) and the like, the constitutional units (B2-2) and the like, and the constitutional units (4-4) and the like each have the same definition as that for the constitutional units (1-2) and the like, the constitutional units (B2-2) and the like, and the constitutional units (4-4) and the like described above.

IRGACURE 819: photopolymerization initiator manufactured by BASF SE, acyl phosphine oxide compound, specifically, bis(2,4,6-trimethylbenzoyl)-phenylphosphine oxide IRGACURE 184: photopolymerization initiator manufactured by BASF SE, carbonyl compound, specifically, 1-hydroxy cyclohexyl phenyl ketone IRGACURE 270: photopolymerization initiator manufactured by BASF SE, triaryl sulfonium hexafluorophosphate ITX: sensitizer, 2-isopropyl thioxanthone (manufactured by Lambson Ltd.)

BP: sensitizer, benzophenone (manufactured by Lambson Ltd.)

TINUVIN 144: antioxidant (manufactured by BASF SE), hindered amine compound, Di(1,2,2,6,6-pentamethyl-4-piperidyl)-2-butyl-2-(3,5-di-tert-butyl-4-hydroxybenzyl)malonate TINUVIN 123: antioxidant (manufactured by BASF SE), hindered amine compound, decanedioic acid bis(2,2,6,6-tetramethyl-1-(octyloxy)-4-piperidinyl)ester 2-Acryloyloxyethylsuccinic acid: radically polymerizable monomer containing carboxy group, manufactured by Kyoeisha Chemical Co., Ltd.)

Acrylic acid: radically polymerizable monomer containing carboxy group (manufactured by Nippon Shokubai Co., Ltd.)

As shown in the results listed in Tables 7 to 9, it was found that a cured film with excellent solvent resistance and glossiness was obtained in a case where the photocurable ink composition according to the present disclosure was used, compared to the photocurable ink compositions of Comparative Examples 1 to 6.

Further, as shown in the results listed in Tables 7 to 9, it was found that the photocurable ink composition according to the present disclosure had excellent storage stability and jetting stability, and the blocking resistance, the scratch resistance, the adhesiveness, and the property of suppressing yellowing of the image to be obtained were excellent.

As shown in Examples 1A to 10A listed in Table 7, the solvent resistance of the cured film to be obtained was further excellent in a case where the amine value of the specific resin was 4 mmol/g or greater.

As shown in Examples 15A and 20A to 24A listed in Table 7, the adhesiveness and the scratch resistance of the cured film to be obtained were excellent in a case where the specific resin had a constitutional unit represented by Formula (3).

As shown in Examples 16A to 19A listed in Table 7, the adhesiveness of the cured film to be obtained and the blocking resistance, the scratch resistance, and the solvent resistance of the cured film to be obtained by being cured using an LED light source were further excellent in a case where the specific resin had a constitutional unit containing an amino group having a cyclic structure and a constitutional unit containing an amino group having a chain structure.

As shown in Examples 1A to 5A and 20A to 24A listed in Tables 7 and 8, the blocking resistance, the solvent resistance, and the glossiness of the cured film to be obtained were further excellent in a case where the specific resin had at least one constitutional unit represented by Formula (1) or (2) and the content of the constitutional unit represented by Formula (1) or (2) was 95% by mass or greater with respect to the total mass of the specific resin.

As shown in Examples 18A and 25A to 28A listed in Tables 7 and 8, the glossiness of the cured film to be obtained was further excellent in a case where at least one terminal structure in the specific resin was a structure represented by Formula (4).

Further, as shown in Examples 18A, 39A, and 40A listed in Table 8, the blocking resistance, the scratch resistance, and the solvent resistance of the image to be obtained and the blocking resistance, the scratch resistance, and the solvent resistance of the cured film to be obtained by being cured using an LED light source were further excellent in a case where the composition had a sensitizer and particularly a thioxanthone compound or a carbonyl compound.

Further, as shown in Examples 18A, 41A, and 42A listed in Tables 8 and 9, the property of suppressing yellowing of the cured film to be obtained was further excellent in a case where the composition had an antioxidant and particularly a hindered amine compound having a molecular weight of 1000 or less.

Further, as shown in Examples 18A and 48A to 55A listed in Tables 8 and 9, the blocking resistance, the scratch resistance, the solvent resistance, the adhesiveness, the storage stability, and the glossiness of the cured film to be obtained and the blocking resistance, the scratch resistance, and the solvent resistance of the cured film to be obtained by being cured using an LED light source were further excellent in a case where the content of the radically polymerizable monomers containing an acid group (including a carboxy group) in the radically polymerizable monomers was 1.0 mmol or less and more preferably 0.1 mmol or less per 100 g of the photocurable ink composition.

The disclosure of JP No. 2017-087555 filed on Apr. 26, 2017 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. A photocurable ink composition comprising:
   a resin which contains an amino group having one or more hydrogen atoms on a carbon atom at an α-position and having an amine value of 4 mmol/g to 12 mmol/g; and
   a radically polymerizable monomer,
   wherein the radically polymerizable monomer contains at least one of a monofunctional radically polymerizable monomer or a bifunctional radically polymerizable monomer,
   a total content of the monofunctional radically polymerizable monomer and the bifunctional radically polymerizable monomer is 50% by mass or greater with respect to a total mass of the photocurable ink composition,
   a content of a radically polymerizable monomer containing an acid group in the radically polymerizable monomers is 1.5 mmol or less per 100 g of the photocurable ink composition, and
   the resin has a constitutional unit represented by at least one of Formula (1) or Formula (2),

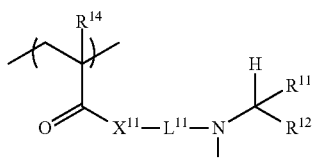
(1)

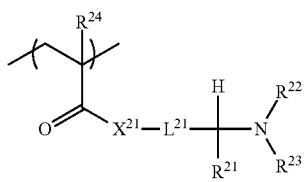
(2)

in Formula (1), $X^{11}$ represents O or $NR^{15}$,
$R^{11}$ to $R^{13}$ each independently represent a hydrogen atom or a hydrocarbon group having 1 to 11 carbon atoms,
$R^{14}$ represents a hydrogen atom or a hydrocarbon group having 1 to 5 carbon atoms,
$L^{11}$ represents a hydrocarbon group having 1 to 11 carbon atoms,
$R^{15}$ represents a hydrogen atom or a hydrocarbon group having 1 to 11 carbon atoms,
$R^{13}$ and $L^{11}$ may be linked to each other to form a ring,
$R^{12}$ and $R^{13}$ may be linked to each other to form a ring, and
$R^{15}$ and $L^{11}$ may be linked to each other to form a ring,
in Formula (2), $X^{21}$ represents O or $NR^{25}$,
$R^{21}$ to $R^{23}$ each independently represent a hydrogen atom or a hydrocarbon group having 1 to 11 carbon atoms,
$R^{24}$ represents a hydrogen atom or a hydrocarbon group having 1 to 5 carbon atoms,
$L^{21}$ represents a hydrocarbon group having 1 to 11 carbon atoms,
$R^{25}$ represents a hydrogen atom or a hydrocarbon group having 1 to 11 carbon atoms,
$R^{21}$ and $L^{21}$ may be linked to each other to form a ring,
$R^{22}$ and $R^{23}$ may be linked to each other to form a ring, and
$R^{25}$ and $L^{21}$ may be linked to each other to form a ring.

2. The photocurable ink composition according to claim 1, wherein the amine value of the resin is 8 mmol/g or greater.

3. The photocurable ink composition according to claim 1, wherein the resin has a constitutional unit represented by Formula (3),

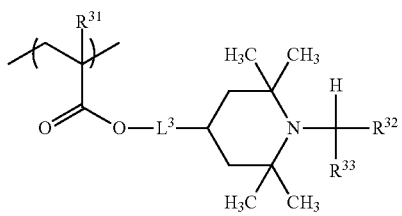
(3)

in Formula (3), $R^{31}$ represents a hydrogen atom or a methyl group, $L^3$ represents a single bond or a divalent hydrocarbon group having 1 to 11 carbon atoms, and
$R^{32}$ and $R^{33}$ each independently represent a hydrogen atom or a hydrocarbon group having 1 to 3 carbon atoms.

4. The photocurable ink composition according to claim 1, wherein the resin has a constitutional unit containing an amino group having a cyclic structure and a constitutional unit containing an amino group having a chain structure.

5. The photocurable ink composition according to claim 1, wherein the resin has at least one constitutional unit represented by Formula (1) or Formula (2), and a total content of the constitutional unit represented by Formula (1) or (2) is 95% by mass or greater with respect to a total mass of the resin.

6. The photocurable ink composition according to claim 1, wherein at least one terminal structure of the resin is a structure represented by Formula (4), $$R^{41}-S-* \quad (4)$$

in Formula (4), $R^{41}$ represents a hydrocarbon group which may have a branch having 8 to 20 carbon atoms, and the symbol "*" represents a linking portion with respect to a resin.

7. The photocurable ink composition according to claim 1, wherein the radically polymerizable monomers include at least one monomer represented by any of Formulae (5) to (8),

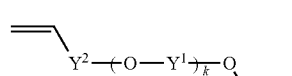
(5)

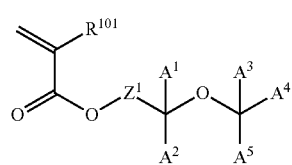
(6)

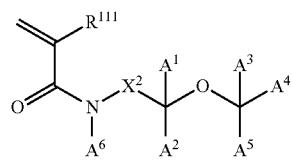
(7)

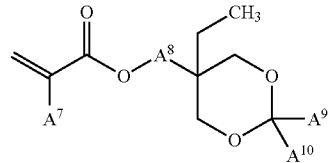
(8)

in Formula (5), $Y^1$'s each independently represent an alkylene group having 1 to 10 carbon atoms,
$Y^2$ represents a single bond or a carbonyl group,
k represents an integer of 1 to 3,
in Formulae (6) and (7), $A^1$ to $A^6$ each independently represent a hydrogen atom, an alkyl group, an alkoxy group, or $-L^{101}-(OR^{102})_{nA}-R^{103}$, $L^{101}$ represents a single bond or an alkylene group, $R^{101}$ represents a hydrogen atom or a methyl group, $R^{102}$'s each independently represent an alkylene group, $R^{103}$ represents a hydrogen atom or an alkoxy group, $R^{111}$ represents a hydrogen atom or a methyl group, nA represents an integer of 1 or greater, at least one of $A^1$ to $A^5$ represents a hydrogen atom, any two of $A^1$ to $A^5$ may be bonded to each other to form a ring, and $Z^1$ and $X^2$ each independently represent an alkylene group, a group formed by combining two or more alkylene groups and one or more ether bonds, or a group formed by combining two or more alkylene groups and one or more ester bonds, in Formula (8), $A^7$, $A^9$, and $A^{10}$ each independently represent a hydrogen atom, a methyl group, or an ethyl group, and $A^8$ represents a single bond or a divalent linking group.

8. The photocurable ink composition according to claim 1, further comprising:
a sensitizer.

9. The photocurable ink composition according to claim 8, wherein the sensitizer contains a thioxanthone compound or a benzophenone compound.

10. The photocurable ink composition according to claim 1, further comprising:
an antioxidant.

11. The photocurable ink composition according to claim 10, wherein the antioxidant contains a hindered phenol compound having a weight average molecular weight of 1000 or less or a hindered amine compound having a weight average molecular weight of 1000 or less.

12. The photocurable ink composition according to claim 1, wherein a content of a radically polymerizable monomer containing a carboxy group in the radically polymerizable monomers is 1.0 mmol or less per 100 g of the photocurable ink composition.

13. An image forming method comprising:
applying the photocurable ink composition according to claim 1 onto a recording medium using an ink jet method; and
irradiating the ink composition applied onto the recording medium with active energy rays.

* * * * *